(12) United States Patent
Takizawa et al.

(10) Patent No.: US 10,616,442 B2
(45) Date of Patent: Apr. 7, 2020

(54) IMAGE READING APPARATUS, PROGRAM, AND IMAGE GENERATION METHOD FOR GENERATING MERGE IMAGE OF PARTIALLY OVERLAPPING AREAS OF IMAGE

(71) Applicant: SEIKO EPSON CORPORATION, Tokyo (JP)

(72) Inventors: Masaaki Takizawa, Kanagawa (JP); Tsuneo Kasai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/293,806

(22) Filed: Mar. 6, 2019

(65) Prior Publication Data
US 2019/0281185 A1   Sep. 12, 2019

(30) Foreign Application Priority Data
Mar. 8, 2018   (JP) .................................. 2018-041551

(51) Int. Cl.
*H04N 1/38*   (2006.01)
*H04N 1/387*   (2006.01)
*H04N 1/192*   (2006.01)
*H04N 1/401*   (2006.01)
*H04N 1/193*   (2006.01)

(52) U.S. Cl.
CPC .......... *H04N 1/3876* (2013.01); *H04N 1/192* (2013.01); *H04N 1/1933* (2013.01); *H04N 1/3878* (2013.01); *H04N 1/401* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 7,406,213 B2 * | 7/2008 | Hasegawa | .............. | H04N 1/407 348/36 |
| 2003/0210558 A1 * | 11/2003 | Konagaya | .......... | H04N 1/02815 362/555 |
| 2013/0286451 A1 * | 10/2013 | Verhaegh | ............. | H04N 1/1903 358/521 |

FOREIGN PATENT DOCUMENTS

| | | |
|---|---|---|
| JP | 2011-155572 A | 8/2011 |
| JP | 2016-127295 A | 7/2016 |

* cited by examiner

*Primary Examiner* — Barbara D Reinier
(74) *Attorney, Agent, or Firm* — Global IP Counselors, LLP

(57) ABSTRACT

An image reading apparatus includes a first sensor that reads a first area of an image, a second sensor that reads a second area, and a processing circuit that generates a merge image by performing a merge process on first image data acquired by reading by the first sensor and second image data acquired by reading by the second sensor. The processing circuit calculates a correction value having a tendency of approaching zero as being away from an overlap area between the first area and the second area based on a reading result acquired by reading the overlap area by the first sensor and a reading result acquired by reading by the second sensor, and generates the merge image by performing an offset process using the correction value.

11 Claims, 16 Drawing Sheets

IMAGE READING APPARATUS, PROGRAM, AND IMAGE GENERATION METHOD FOR GENERATING MERGE IMAGE OF PARTIALLY OVERLAPPING AREAS OF IMAGE

The present invention contains subject matter related to Japanese Patent Application No. 2018-041551 filed in the Japanese Patent Office on Mar. 8, 2018, the entire contents of which are incorporated herein by reference.

BACKGROUND

1. Technical Field

The present invention relates to an image reading apparatus, a program, an image generation method, and the like.

2. Related Art

In the related art, an image reading apparatus that reads an original document having a larger width, than in the case of using one image sensor, by using a plurality of image sensors is known. For example, a large size original document such as A0 or A1 can be read by combining a plurality of image sensors for A3 size or A4 size. Such an image reading apparatus has an advantage of being able to manufacture the image sensor easily at a low cost, compared to the case of using a wide width image sensor.

However, each of the plurality of image sensors may have individual differences, and brightness or a tone of the reading result may vary even in the case of reading the same original document. In addition, the plurality of image sensors are at different positions in an original document transport direction. Thus, an orientation of the original document may vary at reading positions, and the brightness of the reading result may vary. In a case where images having different tones or brightness are joined together, a defect in image quality such as an uneven height or color may occur at a joint.

Therefore, the brightness or the tone is adjusted by performing a correction process on the reading result of the plurality of image sensors. For example, JP-A-2011-155572 discloses a method of calculating evaluation values from pixel values in overlap sections among image sensors, multiplexing the pixel value by a gain such that the evaluation values match, and correcting a difference in brightness among the sensors. In addition, JP-A-2016-127295 discloses a method of using a gain and an offset as correction parameters, determining the correction parameters such that evaluation values match, and correcting a difference among image sensors.

Depending on apparatuses, executing the correction process may not lead to appropriate correction.

SUMMARY

An advantage of some aspects of the invention is implementation of more appropriate correction.

According to an aspect of the invention, an image reading apparatus includes a first sensor that reads a first area of an image of a reading target, a second sensor that reads a second area partially overlapping with the first area in the image, and a processing circuit that generates a merge image by performing a merge process on first image data generated by reading by the first sensor and second image data generated by reading by the second sensor. The processing circuit calculates a correction value having a tendency of approaching zero as being away from an overlap area between the first area and the second area based on a reading result acquired by reading the overlap area by the first sensor and a reading result acquired by reading the overlap area by the second sensor, and generates the merge image by performing an offset process on at least one of the first image data and the second image data using the correction value.

In addition, in the image reading apparatus, the processing circuit may generate the merge image by performing a first offset process in which the offset process using the correction value is performed on an area of the first image data corresponding to half or less of a length of the first sensor in a main scanning direction, and a second offset process in which the offset process using the correction value is performed on an area of the second image data corresponding to half or less of a length of the second sensor in the main scanning direction.

In addition, in the image reading apparatus, the processing circuit may calculate the correction value based on an average value of pixel values acquired by reading the overlap area by the first sensor and an average value of pixel values acquired by reading the overlap area by the second sensor.

In addition, in the image reading apparatus, the processing circuit may generate the merge image without performing gain correction on the first image data and the second image data.

In addition, in the image reading apparatus, an $X_1$ axis is set for the first image data in a direction corresponding to a main scanning direction of the image reading apparatus. For two end points of an area of the first image data on which the offset process is performed, an $X_1$ coordinate value of an end point on an overlap area side is set to Xmerge, and an $X_1$ coordinate value of an end point on another side is set to zero. $D'_1(x_1) = D_1(x_1) + A \times x_1$, in which A is a coefficient obtained based on an average value of pixel values acquired by reading the overlap area by the first sensor, an average value of pixel values acquired by reading the overlap area by the second sensor, and Xmerge that is a length of an area of the first image data on which the offset process is performed. At $x_1$ at which the $X_1$ coordinate value satisfies $0 \leq x_1 \leq X\text{merge}$, $D_1(x_1)$ is a pixel value of the first image data and $D'_1(x_1)$ is a pixel value of the first image data after the offset process.

In addition, in the image reading apparatus, the processing circuit may perform the offset process on the first image data and the second image data using the correction value, and generate an image of an area of the merge image corresponding to the overlap area by merging the first image data after the offset process with the second image data after the offset process.

In addition, in the image reading apparatus, $$D'(x) = \frac{x_B - x}{x_B - x_A} D'_1(x) + \frac{x - x_A}{x_B - x_A} D'_2(x).$$

with x being equal to or smaller than $x_A$ and equal to or larger than $x_B$, in which an X axis is set in a direction corresponding to a main scanning direction of the image reading apparatus, and for two end points of the overlap area, $x_A$ is an X coordinate value of an end point on the first sensor, and $x_B$ is an X coordinate value of an end point on the second sensor, with $x_A$ being smaller than $x_B$. At x at which the X coordinate value satisfies $x_A \leq x \leq x_B$, $D'_1(x)$ is a pixel value of the first image data after the offset process, $D'_2(x)$ is a pixel value of the second image data after the offset process, and $D'(x)$ is a pixel value of the merge image.

In addition, in the image reading apparatus, the image reading apparatus may further include a first analog front end that performs A/D conversion on an analog signal from the first sensor and outputs the first image data which is digital data to the processing circuit, and a second analog front end that performs A/D conversion on an analog signal from the second sensor and outputs the second image data which is digital data to the processing circuit. The processing circuit may perform the offset process by digital signal processing based on the first image data from the first analog front end and the second image data from the second analog front end.

In addition, according to another aspect of the invention, there is provided a program that generates a merge image by performing a merge process on first image data generated by reading by a first sensor reading a first area of an image of a reading target and second image data generated by reading by a second sensor reading a second area partially overlapping with the first area in the image. The program causes a computer to execute calculating a correction value having a tendency of approaching zero as being away from an overlap area between the first area and the second area based on a reading result acquired by reading the overlap area by the first sensor and a reading result acquired by reading the overlap area by the second sensor, and generating the merge image by performing an offset process on at least one of the first image data and the second image data using the correction value.

In addition, according to still another aspect of the invention, there is provided an image generation method for generating a merge image by performing a merge process on first image data generated by reading by a first sensor reading a first area of an image of a reading target and second image data generated by reading by a second sensor reading a second area partially overlapping with the first area in the image. The method includes calculating a correction value having a tendency of approaching zero as being away from an overlap area between the first area and the second area based on a reading result acquired by reading the overlap area by the first sensor and a reading result acquired by reading the overlap area by the second sensor, and generating the merge image by performing an offset process on at least one of the first image data and the second image data using the correction value.

BRIEF DESCRIPTION OF THE DRAWINGS

The invention will be described with reference to the accompanying drawings, wherein like numbers refer to like elements.

DESCRIPTION OF EXEMPLARY EMBODIMENTS

Hereinafter, the present embodiment will be described. The embodiment described below does not unduly limit the content of the invention disclosed in the claims. In addition, not all configurations described in the embodiment are essential constituents of the invention.

1. System Configuration Example

Figure 1:
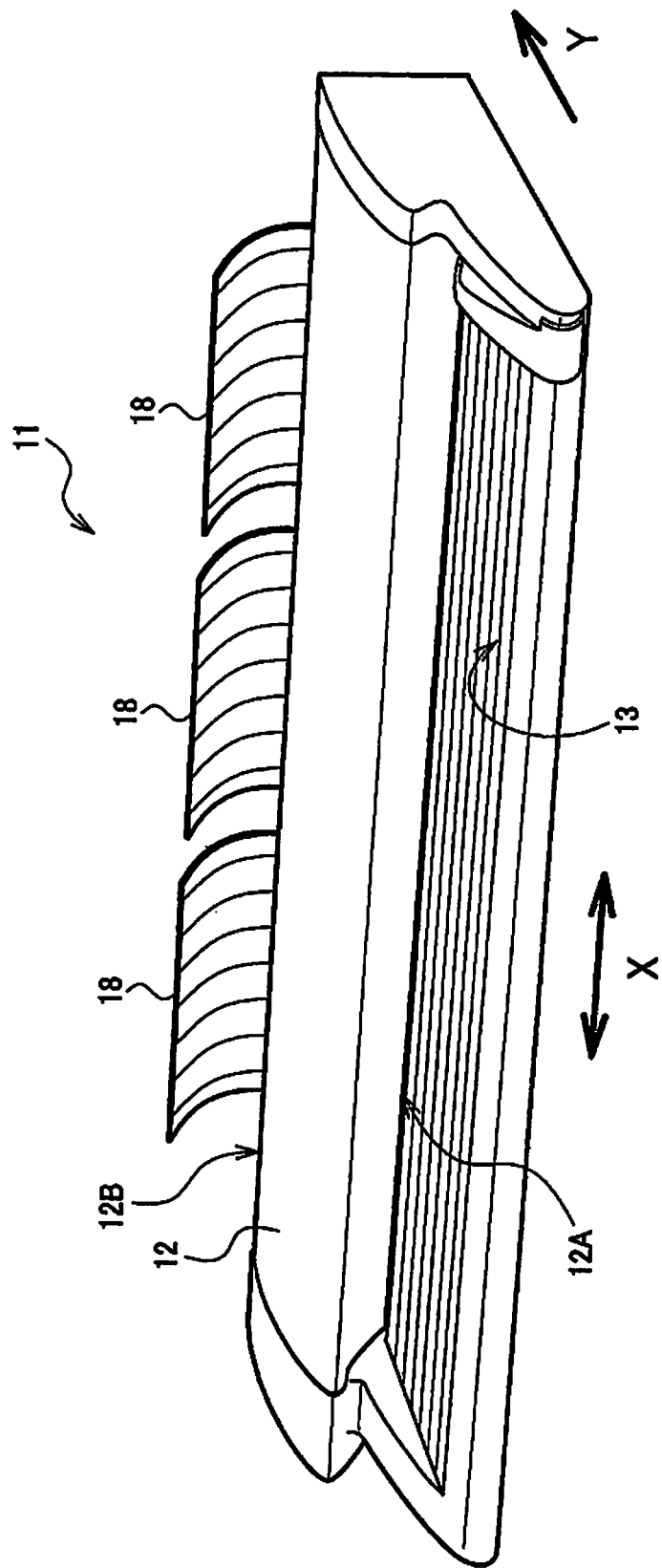
FIG. 1 is a perspective view of an image reading apparatus.

FIG. 1 is a perspective view of an image reading apparatus 11 according to the embodiment. As illustrated in FIG. 1, the image reading apparatus 11 of the embodiment includes a main body 12 and a mounting surface 13 on which an original document D that is an image reading target is mounted (set). In the present embodiment, the reading target of the image reading apparatus 11 is assumed to be a large size original document such as A0 or A1. Thus, the length of the mounting surface 13 in an original document transport direction is smaller than the length of the original document D, and the mounting surface 13 is used for mounting the leading edge part of the original document D. The leading edge part of the original document refers to an edge part on a side that is initially read by the image reading apparatus 11.

The original document D mounted on the mounting surface 13 is fed to a feeding port 12A that is open in the front surface part of the main body 12. The fed original document D is transported along a predetermined transport path 32 (refer to FIG. 2) in the main body 12. An image is read at a reading position in the middle of the transport of the original document D. Then, the original document D is discharged from a discharge port 12B that is open in the rear side upper part of the main body 12, and, for example, is transported to the front side of the main body 12 along a discharge guide 18. When the image reading apparatus 11 reads the image of the original document D, a width direction X is set as a main scanning direction, and a transport direction Y is set as a subscan direction.

For example, the image reading apparatus 11 illustrated in FIG. 1 is attached and electrically coupled to a multifunction peripheral (MFP) by a dedicated attaching jig. In this case, an operation unit of the multifunction peripheral receives an input operation from a user, and a display unit of the multifunction peripheral displays various information to the user. Read data is stored in a storage unit of the multifunction peripheral. The stored data may be used for printing by the multifunction peripheral or may be transmitted to an apparatus such as a PC through a network and used by the transmission destination apparatus. Alternatively, the image reading apparatus 11 of the embodiment may be an apparatus that can operate without coupling to the multifunction peripheral. In this case, for example, the image reading apparatus 11 includes a display unit and an operation unit, not illustrated, and is configured to couple to an apparatus such as a PC.

Figure 2:
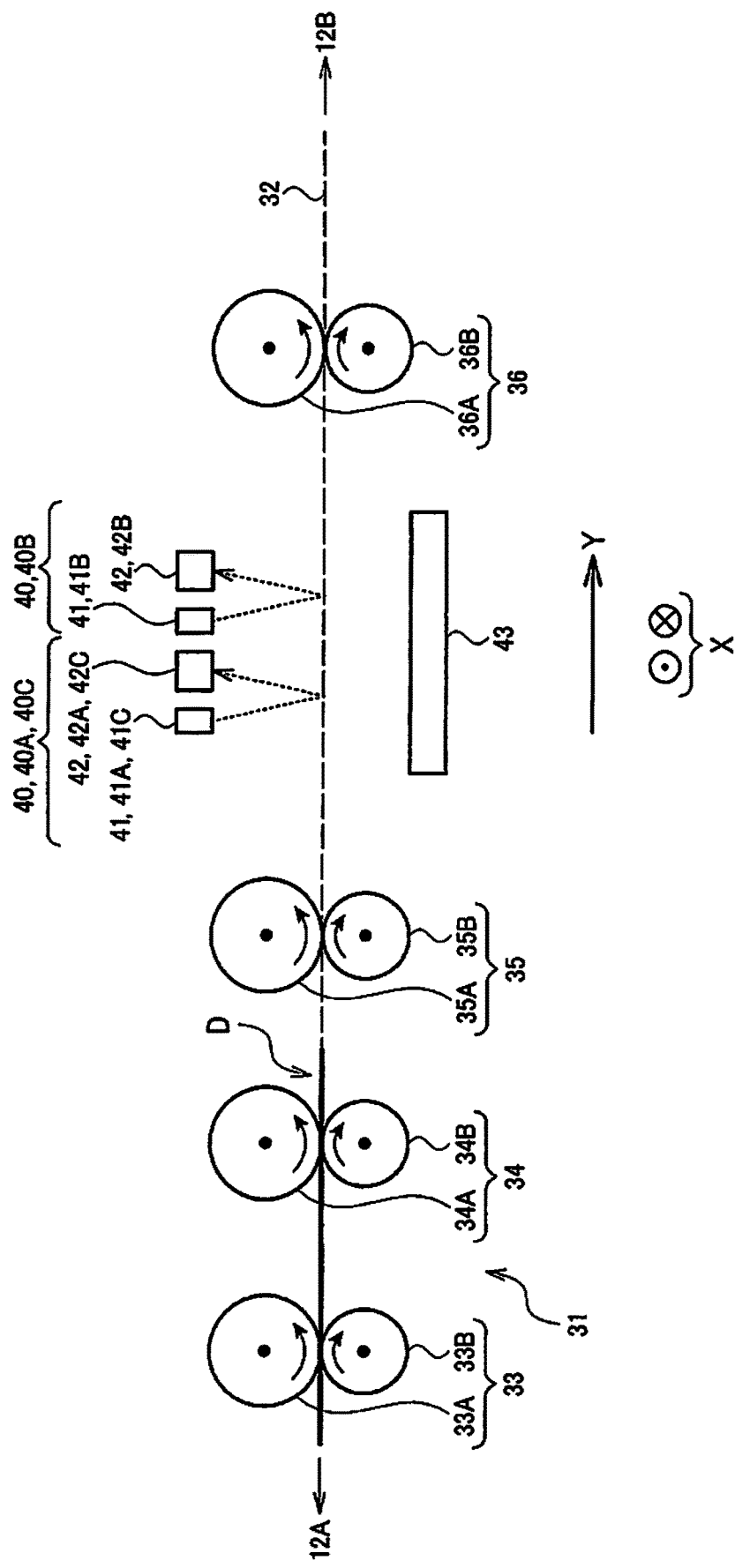
FIG. 2 is a sectional view of a main part of the image reading apparatus.

FIG. 2 is a diagram describing an operation of transporting and reading the original document D and is a diagram illustrating a part of the section of the image reading apparatus 11 in a simplified manner. As illustrated in FIG. 2, a transport mechanism 31 that transports the original document D is disposed in the main body 12 of the image reading apparatus 11. The transport mechanism 31 guides and feeds the original document D mounted on the mounting surface 13 into the main body 12 from the feeding port 12A and transports the fed original document D at a constant transport speed along the transport path 32.

The transport mechanism 31 includes a feeding roller pair 33 that is arranged at a position at the upstream end of the transport path 32 in the main body 12, a feeding roller pair 34 that is arranged on the downstream side of the feeding roller pair 33 in the transport direction, a transport roller pair 35 that is arranged on the upstream side of the reading position of the original document D in the transport direction Y, and a transport roller pair 36 that is arranged on the downstream side of the reading position of the original document D in the transport direction Y.

The feeding roller pairs 33 and 34 are configured with drive rollers 33A and 34A and driven rollers 33B and 34B. In addition, the transport roller pairs 35 and 36 are configured with drive rollers 35A and 36A and driven rollers 35B and 36B. The driven rollers 33B to 36B are rotated together by rotation of the drive rollers 33A to 36A of their respective pairs. Each of the drive rollers 33A to 36A constituting the plurality of roller pairs 33 to 36 is rotationally driven by power of its power source of a transport motor (not illustrated).

As illustrated in FIG. 2, a reading unit 40 is disposed at the reading position in the middle of the transport path 32 that is formed in the main body 12 by the feeding roller pairs 33 and 34 and the transport roller pairs 35 and 36. The reading unit 40 includes a plurality of reading units. FIG. 2 illustrates an example in which the reading unit 40 includes a first reading unit 40A, a second reading unit 40B, and a third reading unit 40C. The reading unit 40 (40A, 40B, and 40C) is configured with a light source 41 (41A, 41B, and 41C) that can radiate light to the original document D during its transport, and an image sensor 42 (42A, 42B, and 42C) that extends in the main scanning direction (width direction X). While an example of performing a single side scan is illustrated here, a double side scan of the original document may be configured by disposing the reading units 40 with the transport path 32 interposed therebetween.

The light source 41 is configured with, for example, a light emitting diode (LED) or a fluorescent lamp. The image sensor 42 receives reflected light from reflection of the light emitted from the light source 41 by the original document D or the like, converts the received light into an electric signal, and outputs a pixel signal having a value corresponding to the intensity of received light. The image sensor 42 is, for example, a linear image sensor. The image reading apparatus 11 can perform a color scan and a monochrome scan (gray scale scan). The color scan method includes a method of acquiring pixel signals of RGB colors in order from monochrome image sensors by causing light sources of RGB colors to emit light in order in a time series manner, and a method of including photoelectric conversion elements of RGB colors covered with color filters in an image sensor and acquiring pixel signals of RGB from the photoelectric conversion elements by causing a white light source to emit light. The color scan method may be any of the methods. While an example of disposing the light source 41 for each reading unit 40 is illustrated in FIG. 2, one light source 41 may be shared by a plurality of reading units 40.

The image sensor 42 is, for example, a contact type image sensor in which a plurality of photoelectric conversion elements are arranged in a row in the main scanning direction X. Furthermore, the image sensor 42 is specifically a complementary metal oxide semiconductor (CMOS) image sensor.

Furthermore, a color reference plate 43 is arranged at a position that faces the image sensor 42 with the transport path 32 interposed therebetween. The color reference plate 43 is used for acquiring a white reference value for shading correction. Thus, a white reference plate having white color or a gray reference plate having gray color (ash color) is used as the color reference plate 43. The gray reference plate is used for detecting the position and the area of the original document D based on a difference in color or brightness value between the original document and a background from reading data in which the color reference plate 43 is read as the background (gray background) of the original document.

FIG. 1 and FIG. 2 are one example of the configuration of the image reading apparatus 11. Various modifications can be made to a specific exterior or an internal structure of the image reading apparatus 11. For example, reading may be performed by fixing the original document D and moving the image sensor 42. In this case, the influence of the orientation of the original document D is reduced. However, since there are individual differences among the image sensors 42, a correction process for image data is needed.

Figure 3:
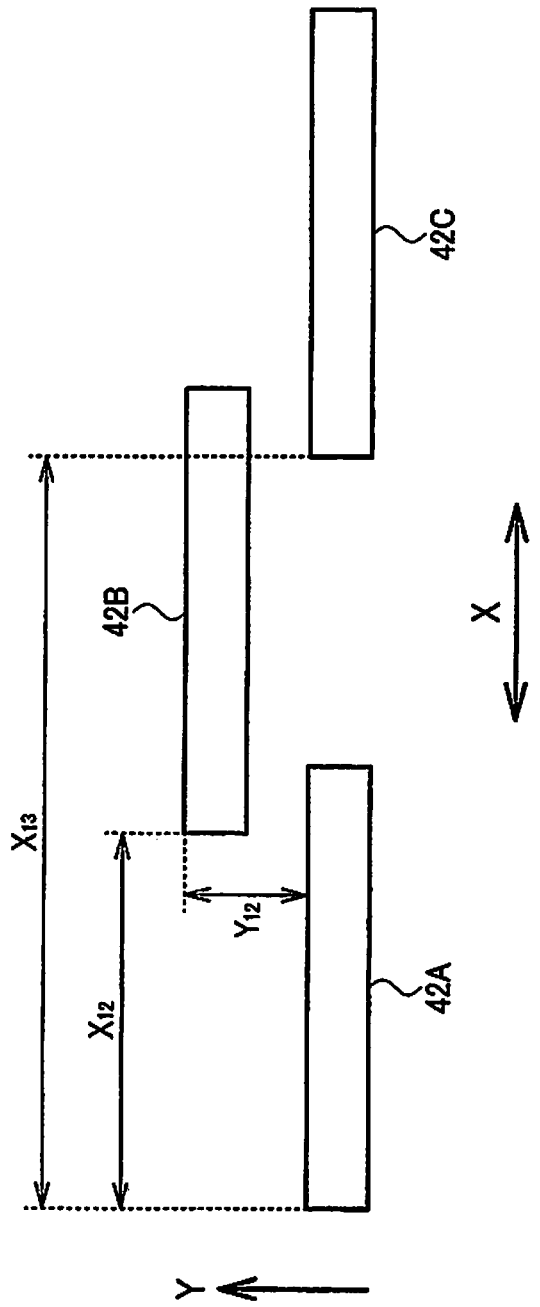
FIG. 3 is a diagram describing a positional relationship of a plurality of image sensors.

FIG. 3 is a diagram describing the arrangement of a plurality of image sensors 42. As illustrated in FIG. 3, the plurality of image sensors 42 are arranged in the main scanning direction. The number of image sensors 42 is not limited to three and can be any number greater than or equal to two. As illustrated in FIG. 3, by lining up the plurality of image sensors 42 in the main scanning direction, a width in which the original document D can be read is increased.

Two adjacent image sensors 42A and 42B are at different positions in the subscan direction and are disposed at positions at which their end parts overlap in the main scanning direction. In the example in FIG. 3, the image sensor 42B is arranged at a position away by $Y_{12}$ from the image sensor 42A in the Y direction. In addition, the length from the end point of the image sensor 42A to the end point of the image sensor 42B is denoted by $X_{12}$, and $X_{12}$ is smaller than the horizontal width of the image sensor 42. Similarly, two adjacent image sensors 42B and 42C are at different positions in the subscan direction and are disposed at positions at which their end parts overlap in the main scanning direction.

FIG. 3 illustrates an example in which the image sensor 42A and the image sensor 42C are at the same position in the subscan direction. For example, the image sensor 42 of the embodiment includes a first image sensor group of which the position in the subscan direction is a first position, and a second image sensor group of which the position in the subscan direction is a second position. The image sensor 42 included in the first image sensor group is alternately arranged with the image sensor 42 included in the second image sensor group in the main scanning direction. In the example in FIG. 3, the first image sensor group corresponds to the image sensor 42A and the image sensor 42C, and the second image sensor group corresponds to the image sensor 42B. The arrangement of the image sensor 42 is not limited to such an example, provided that conditions such that two adjacent image sensors 42 are at different positions in the subscan direction, and their end parts overlap in the main scanning direction are satisfied. For example, the image sensor 42A and the image sensor 42C may be at different positions in the subscan direction.

Figure 4:
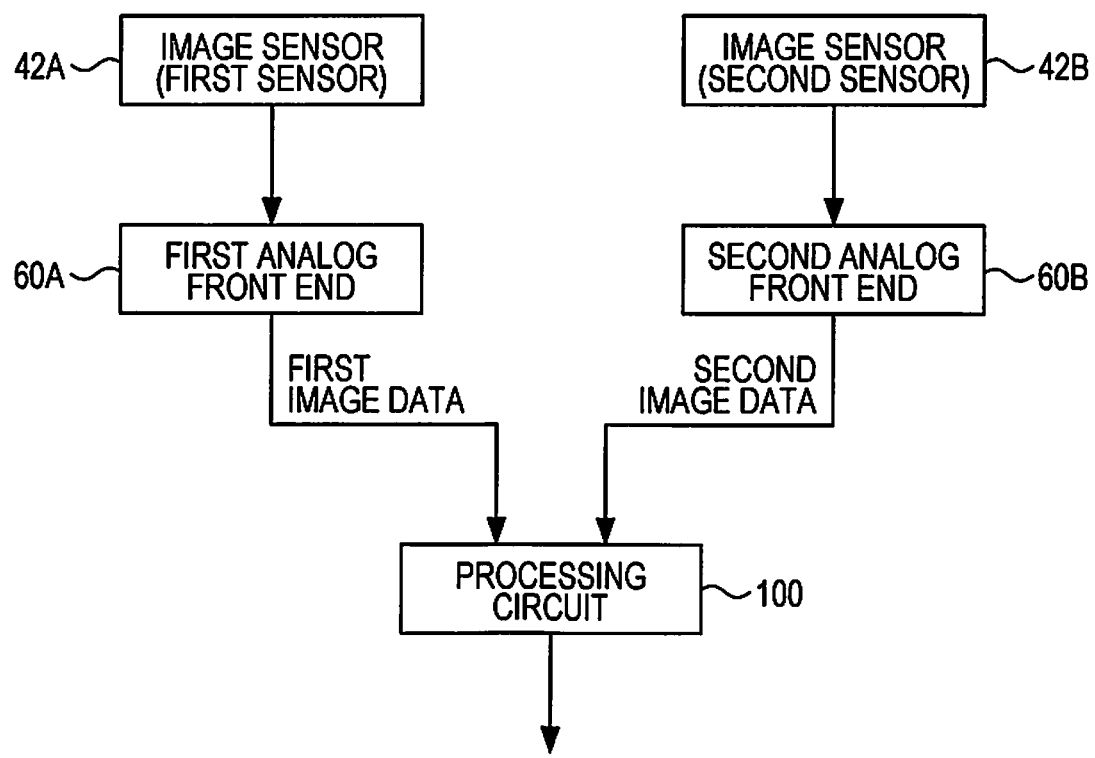
FIG. 4 is a system configuration example of the image reading apparatus.

FIG. 4 is a configuration example of the image reading apparatus 11 of the embodiment. The image reading apparatus 11 includes a first sensor that reads a first area of an image of the reading target, and a second sensor that reads a second area that partially overlaps with the first area in the image of the reading target. In the following description, the first sensor corresponds to the image sensor 42A, and the second sensor corresponds to the image sensor 42B. In this case, the first area is an area that is determined by the horizontal width of the image sensor 42A and the positional relationship between the image sensor 42A and the original document D, and is specifically a rectangular area that is long in the subscan direction. The second area is an area that is determined by the horizontal width of the image sensor 42B and the positional relationship between the image sensor 42B and the original document D, and is specifically a rectangular area that is long in the subscan direction. The first sensor and the second sensor can be further considered as a set of two adjacent image sensors 42 among the plurality of image sensors 42 included in the image reading apparatus 11.

In addition, the image reading apparatus 11 includes a processing circuit 100 that generates a merge image by performing a merge process on first image data generated by reading by the first sensor and second image data generated by reading by the second sensor. The first image data is a reading result of the first sensor and is image data corresponding to the first area of the original document D. The second image data is a reading result of the second sensor and is image data corresponding to the second area of the original document D.

Each process and each function of the embodiment performed by the processing circuit 100 can be implemented by a processor including hardware. For example, each process of the embodiment can be implemented by a processor that operates based on information such as a program, and a memory that stores information such as a program. In the processor, for example, the function of each unit may be implemented by individual hardware, or the function of each unit may be implemented by single hardware. For example, the processor can include hardware, and the hardware can include at least one of a circuit processing a digital signal and a circuit processing an analog signal. For example, the processor can be configured with one or a plurality of circuit devices or one or a plurality of circuit elements mounted on a circuit substrate. The circuit device is an integrated circuit (IC) or the like, and the circuit element is a resistor, a capacitor, or the like. The processor may be, for example, a central processing unit (CPU). The processor is not limited to a CPU, and various processors such as a graphics processing unit (GPU) or a digital signal processor (DSP) can be used. In addition, the processor may be a hardware circuit based on an application specific integrated circuit (ASIC). In addition, the processor may be configured with a plurality of CPUs or may be configured with a hardware circuit based on a plurality of ASICs. In addition, the processor may be configured with a combination of a plurality of CPUs and a hardware circuit based on a plurality of ASICs. In a narrow sense, the processing circuit 100 is a system-on-a-chip (SoC) in which a processor core, a memory, and an interface for data transfer are mounted on one chip.

In addition, as illustrated in FIG. 4, the image reading apparatus 11 includes a first analog front end 60A and a second analog front end 60B. The first analog front end 60A performs A/D conversion on an analog signal from the first sensor and outputs the first image data of digital data to the processing circuit 100. The second analog front end 60B performs A/D conversion on an analog signal from the second sensor and outputs the second image data of digital data to the processing circuit 100. The processing circuit 100 performs a process of generating the merge image by digital signal processing, more specifically, an offset process, described below, based on the first image data from the first analog front end 60A and the second image data from the second analog front end 60B.

By doing so, a process related to image merge can be implemented by a digital process. It is not easy to predict the orientation of the original document D at the time of reading, and it is difficult to store a correction value used for the correction process in advance. Regarding such a point, the correction process corresponding to a situation can be easily implemented by digitally performing the correction process. In addition, the correction process needs various processes described below in FIG. 9 to FIG. 14. Thus, by digitally performing a process, the circuit size can be reduced, compared to that in the case of using an analog circuit.

The first image data and the second image data that are targets for the merge process in the embodiment may be, but not limited to, the outputs of the first analog front end 60A and the second analog front end 60B. For example, the processing circuit 100 may perform well-known preprocessing such as shading correction on the first image data from the first analog front end 60A and the second image data from the second analog front end 60B and may perform the merge process on the first image data and the second image data after preprocessing as targets. That is, the "first image data generated by reading by the first sensor" in the embodiment is data acquired by performing preprocessing including at least the A/D conversion process on the analog signal of the output of the first sensor, and the preprocessing can include various processes such as an analog gain process and a digital shading correction process. The same applies to the second image data.

Figure 5:
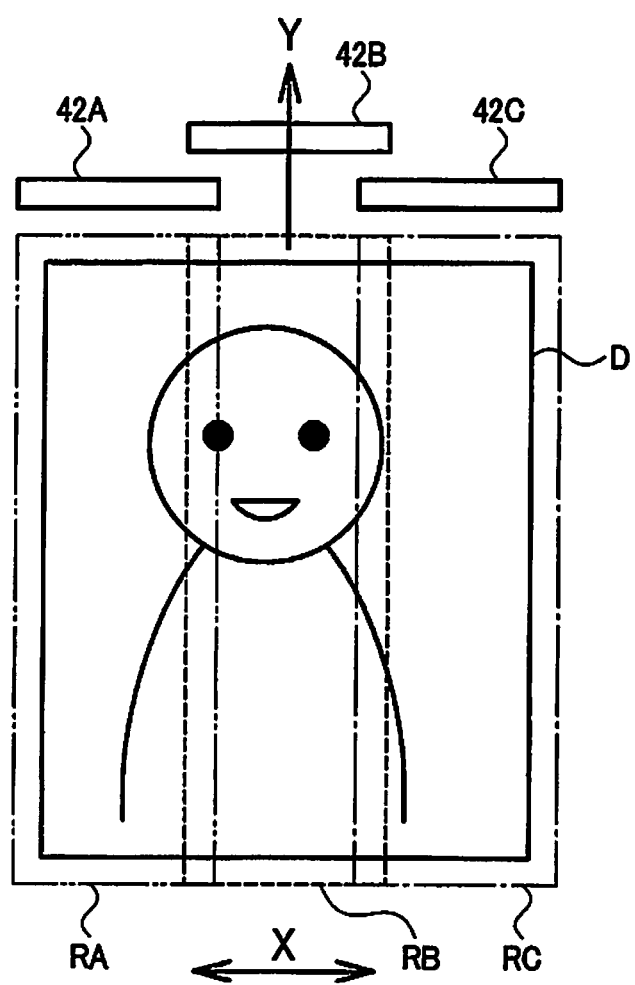
FIG. 5 is a diagram describing a relationship between an image sensor and an original document.

FIG. 5 is a diagram describing a relationship between the original document D and the image sensor 42. The original document D is transported in the Y direction which is the transport direction. The image sensor 42A reads an image of an area denoted by RA. The image sensor 42B reads an image of an area denoted by RB. The image sensor 42C reads an image of an area denoted by RC. A marginal area can be disposed in the subscan direction by starting reading before the leading edge of the original document D reaches the image sensor 42 and continuing reading after the trailing edge of the original document D passes through the image sensor 42. In addition, as illustrated in FIG. 5, a marginal area can also be disposed in the main scanning direction by setting the width in which the image sensor 42 is disposed to be greater than the assumed width of the original document D. By disposing the marginal area, oblique motion correction or the like in a case where the original document D has an oblique motion with respect to the transport direction can be performed. The marginal area represents an area in which the original document D is assumed to be not present in a case where the original document D is transported without an oblique motion.

In RA in FIG. 5, at least a range in which the original document D is read corresponds to the first area of the embodiment. Similarly, in RB, at least a range in which the original document D is read corresponds to the second area. In RC, at least a range in which the original document D is read corresponds to a third area. The whole RA may be set as the first area. The whole area RB may be set as the second area. The whole RC may be set as the third area.

Figure 6:
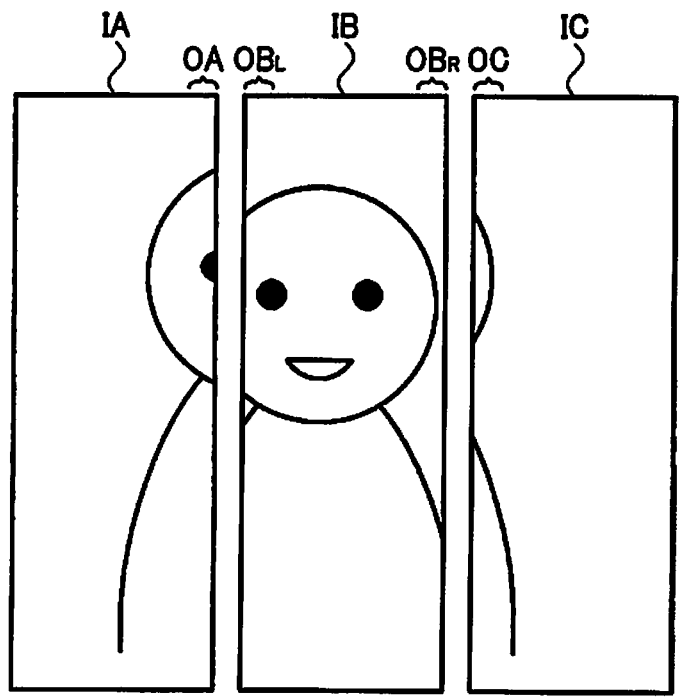
FIG. 6 is an example of image data that is a reading result.

FIG. 6 is a diagram representing the reading results of the image sensors 42A to 42C. In FIG. 6, the first image data corresponding to the reading result of the image sensor 42A is denoted by IA. The second image data corresponding to the reading result of the image sensor 42B is denoted by IB. Third image data corresponding to the reading result of the image sensor 42C is denoted by IC.

As illustrated in FIG. 5, the image sensor 42B and the image sensor 42A are at different positions in the subscan direction. Thus, in a case where images read at the same timing are compared, the image sensor 42B is later by the number of pixels corresponding to $Y_{12}$ than the image sensor 42A. Thus, as illustrated in FIG. 6, in a case where images are lined up such that the reading timing is aligned, the second image data (IB) deviates in the downward direction, compared to the first image data (IA) and the third image data (IC).

Figure 7:
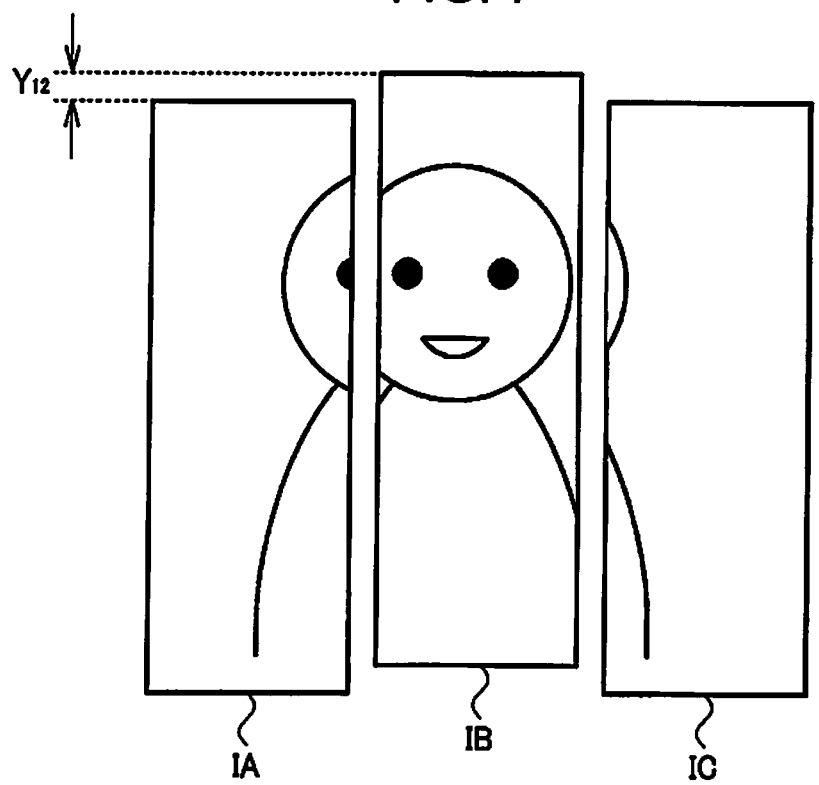
FIG. 7 is a diagram describing a position correction process in a subscan direction.

FIG. 7 is a descriptive diagram of a process of correcting the position in the subscan direction. Here, $Y_{12}$ that denotes the difference in attaching position between the image sensor 42A and the image sensor 42B is data that is known in a design stage of the image reading apparatus 11. Thus, the processing circuit 100 corrects the position in the subscan direction by performing a process of relatively moving the second image data in an upward direction by the number of pixels corresponding to $Y_{12}$.

In addition, as illustrated in FIG. 5, the end parts of the adjacent image sensors 42 overlap in the main scanning direction. Thus, the first area and the second area overlap partially. Hereinafter, this area will be referred to as an overlap area. Thus, the first image data (OA) corresponding to the overlap area and the second image data ($OB_L$) corresponding to the overlap area are data acquired by reading a common image. Similarly, the second image data ($OB_R$) corresponding to an overlap area between the second area and the third area and the third image data (OC) corresponding to the overlap area are data acquired by reading a common image. In the case of distinguishing the overlap area between the first area and the second area from the overlap area between the second area and the third area, the former will be referred to as a first overlap area, and the latter will be referred to as a second overlap area. The position in the subscan direction may be corrected by analyzing the image and calculating $Y_{12}$. This analysis is, for example, calculation of the number of pixels needed for matching a pattern of the image in the first overlap area of the first area and a pattern of the image in the first overlap area of the second area.

Figure 8:
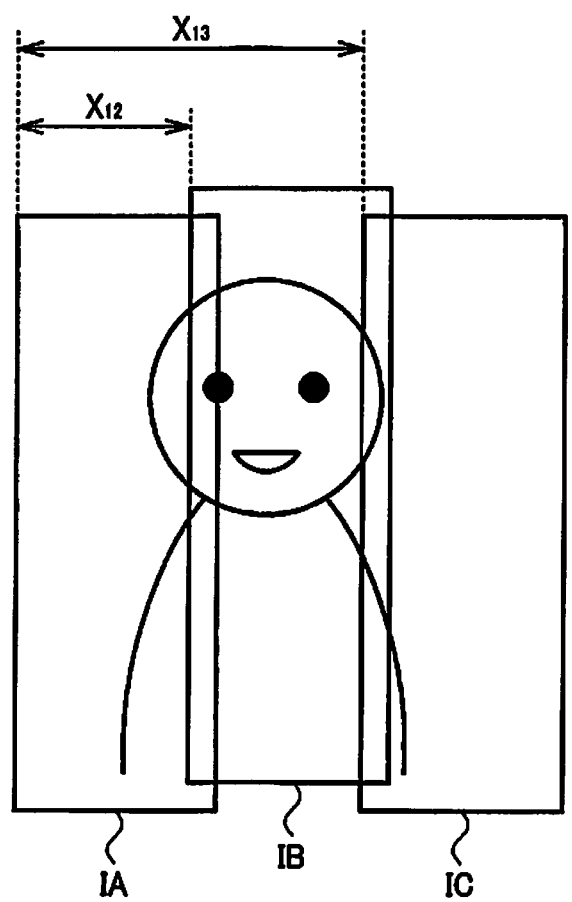
FIG. 8 is a diagram describing the position correction process in a main scanning direction.

FIG. 8 is a descriptive diagram of a process of correcting the position in the main scanning direction. Here, $X_{12}$ that denotes the difference in attaching position between the image sensor 42A and the image sensor 42B is data that is known in the design stage of the image reading apparatus 11. Thus, the processing circuit 100 corrects the position in the main scanning direction such that the end part of the second image data is positioned at a position away by the number of pixels corresponding to $X_{12}$ from the end part of the first image data. Similarly, the processing circuit 100 corrects the position of the third image data in the main scanning direction such that the end part of the third image data is positioned at a position away by the number of pixels corresponding to $X_{13}$ from the end part of the first image data.

By performing the position correction illustrated in FIG. 7 and FIG. 8, a plurality of image data acquired by the plurality of image sensors 42 can be merged in an appropriate positional relationship.

2. Process of Generating Merge Image

Hereinafter, the merge process for the first image data and the second image data in the embodiment will be described in detail.

2.1 Summary

A deviation in positional relationship among the image sensors 42 can be corrected by the position correction process illustrated in FIG. 7 and FIG. 8. However, individual differences are present among the image sensors 42, and the brightness or the tone of the reading result may vary even in the case of reading the same original document.

In addition, while the transport path 32 of the original document D is illustrated in FIG. 2, the orientation of the original document D during its transport is not necessarily constant. Two orientations of the original document D are considered. The first is a two-dimensional orientation that represents rotation in a plane representing the ideal transport path 32, that is, the state of an oblique motion (skew). The second is a three-dimensional orientation that represents an extent to which each part of the original document D is displaced with respect to the plane representing the ideal transport path 32. The orientation concerned here is the three-dimensional orientation that may change the distance between the image sensor 42 and the original document D. Even in a case where the same image reading apparatus 11 and the same transport mechanism 31 are used, the orientation of the original document D may be changed depending on the type of paper. In addition, even in the case of the same original document D, the orientation may be changed in a period from the start of transport until the end of reading. The plurality of image sensors 42 are at different position in the transport direction. Thus, the orientation of the original document D when the image sensor 42A reads a given line of the original document D may be different from the orientation of the original document D when the image sensor 42B reads the same line. Such a difference in orientation also causes the brightness or the tone of the reading result to vary.

The line represents a rectangular area that is long in the main scanning direction and is acquired by extracting a range of the original document D corresponding to given one pixel in the subscan direction. In addition, hereinafter, the term line will also be used for data corresponding to given one pixel in the subscan direction in the image data of the reading result. For example, a "given line of image data" represents data acquired by extracting given one pixel in the subscan direction from the image data.

In the case of simply merging image data having different tones or brightness, a defect in image quality such as a difference in level or uneven color may occur at a joint, and a change in brightness or tone in a boundary part may stand out.

The plurality of image sensors 42 are disposed in an overlapping manner. Thus, the correction process is performed based on the reading result of the overlap area. However, in the case of performing the gain process as in JP-A-2011-155572, there may be a concern in a case where the level of the pixel value of the overlap area is low. For example, an example in which the average value of pixel values is set as an evaluation value, and the ratio of the evaluation value is set as a gain is considered. In a case where the range of the pixel value is 0 to 255, and one evaluation value is 10, and another evaluation value is 20, a gain process that doubles the pixel value with respect to the image data is performed. In a case where the pixel value outside the overlap area is approximately equal to 100, the pixel value changes by approximately 100 before and after the correction process, and tone becomes unnatural. Depending on the pixel value before correction, the pixel value may be saturated by the gain process. Such a point is a concern in JP-A-2011-155572 and JP-A-2016-127295 since the gain process is performed in any of JP-A-2011-155572 and JP-A-2016-127295.

In addition, the correction process when the level of the pixel value in the overlap area is different from the level of the pixel value outside the overlap area also needs to be concerned. For example, the orientation of the original document D with the overlap area close to the image sensor 42A and the other area present on the standard transport path is set as an orientation 1. The orientation of the original document D with the overlap area away from the image sensor 42A and the other area present on the standard transport path is set as an orientation 2. The orientation in a case where a predetermined line of the original document D passes through the image sensor 42A is the orientation 1. The orientation in a case where the same line of the original document D passes through the image sensor 42B is the orientation 2. In this case, the area of the first image data other than the overlap area and the area of the second image data other than the overlap area are less affected by the orientation of the original document D, and significant correction of the pixel value is not needed. However, when the overlap area is considered, the orientation 1 is significantly different from the orientation 2. Thus, the difference between the evaluation value obtained from the first image data and the evaluation value obtained from the second image data is significantly large, and the amount of correction is also large.

In JP-A-2011-155572 and JP-A-2016-127295, the correction process is uniformly performed on the whole image data using obtained correction parameters. In the above example, correction that significantly changes the pixel value is performed in an area having low necessity of correction in the first image data other than the overlap area and an area having low necessity of correction in the second image data other than the overlap area. The original brightness and the original tone may deteriorate. In other words, the correction process based on the overlap area excessively affects the other area, and excessive correction is performed.

In view of such a point, the processing circuit 100 according to the embodiment calculates the correction value of which the value changes depending on the distance from the overlap area, based on the reading result of the first sensor acquired by reading the overlap area between the first area and the second area and the reading result of the second sensor acquired by reading the overlap area. The processing circuit 100 generates the merge image by performing the offset process on at least one of the first image data and the second image data using the correction value. Hereinafter, an example of performing the offset process on both of the first image data and the second image data will be first described, and a case of performing the offset process on any one image data will be described as a modification example.

In a method of the embodiment, first, the correction process is executed by the offset process. The offset process is an addition process or a subtraction process for the correction value. In other words, the processing circuit of the embodiment generates the merge image without performing gain correction on the first image data and the second image data. Accordingly, excessive correction or the like accompanied by the above gain process can be reduced. The correction value may be any of a positive value or a negative value. That is, in a case where the correction value is a positive value, the offset process is a process of increasing the pixel value. In a case where the correction value is a negative value, the offset process is a process of decreasing the pixel value. In addition, in the following description, the amount of change in pixel value caused by the offset process will be referred to as a "change width", an "increase width", or a "decrease width". Those widths are the absolute value of the correction value and are positive values. Accordingly, even in a case where the level of the evaluation value obtained from the overlap area is low, excessive correction can be reduced. The pixel value may be the brightness value in monochrome image data or may be an R pixel value, a B pixel value, and a G pixel value in color image data. In the case of using the color image data, the offset process is executed on each of R image data, B image data, and G image data. Various modifications can be made such that information acquired with given color image data is used as other color image data.

In addition, in the method of the embodiment, the correction value that is applied to the image data changes depending on the position in the main scanning direction. That is, the intensity of the correction process can be flexibly controlled depending on the position in the main scanning direction.

More specifically, the processing circuit 100 generates the merge image by performing the offset process using the correction value that tends to approach zero as being away from the overlap area. The correction value that tends to approach zero as being away from the overlap area refers to an expression that approaches zero as being away from the overlap area in a case where the relationship between the position and the magnitude of the correction value is approximated to a linear expression. For example, the expression includes not only a monotonic change in a narrow sense such that the expression approaches zero at all times as being away from the overlap area, but also a monotonic change in a broad sense such that the correction value does not change in a certain area but approaches zero at all times in another area.

In the offset process for one of the first image data and the second image data, the correction value in the overlap area is a negative value, and the correction value increases and approaches zero as being away from the overlap area. In the offset process for the other, the correction value in the overlap area is a positive value, and the correction value decreases and approaches zero as being away from the overlap area. By doing so, the change width of the pixel value is decreased as being away from the overlap area. Thus, even in a case where the difference between two evaluation values obtained from the overlap area is significant, excessive correction in the area other than the overlap area can be reduced. Particularly, in a case where the overlap area is present on both left and right sides like the image sensor 42B, it is desirable to set the correction value to zero around the center of the image sensor 42B and gradually increase the change width of the pixel value in a direction toward the overlap area in the end part of the image sensor 42B. Accordingly, by using the overlap area and an area near the overlap area, the first image data and the second image data can be smoothly joined easily, and the second image data and the third image data can be smoothly joined easily. In other words, the correction process that prevents a difference in level at the joint between the first image data and the second image data from standing out can be performed.

Figure 9:
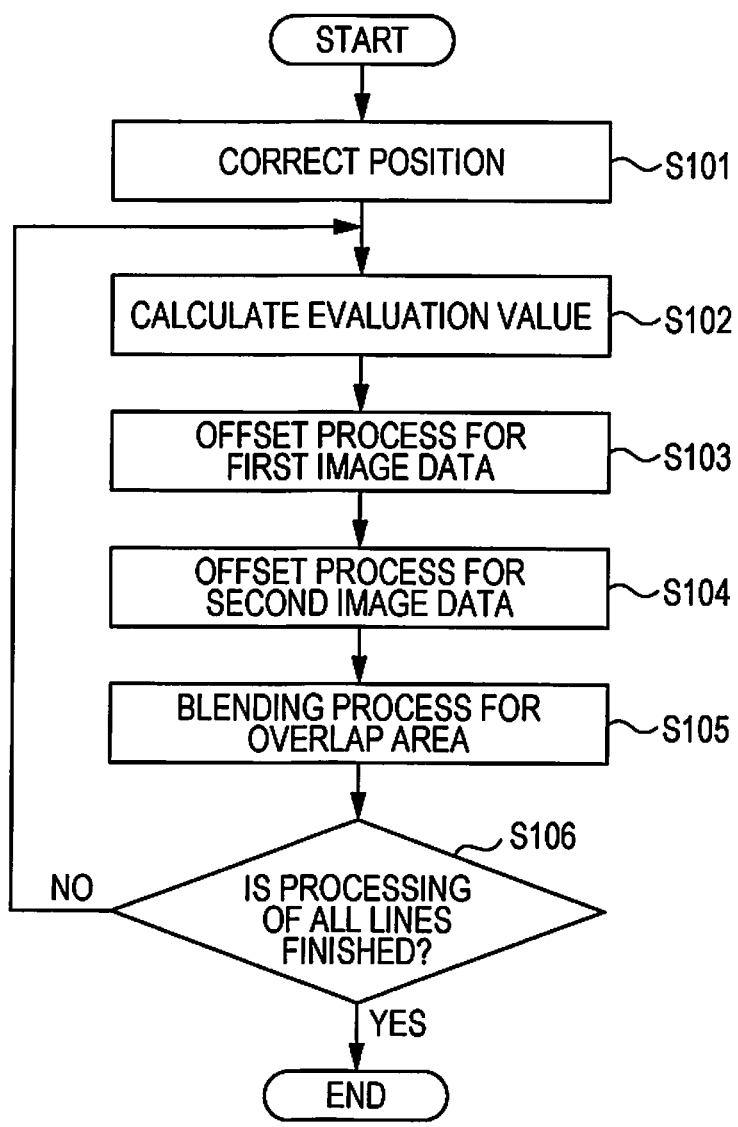
FIG. 9 is a flowchart describing a process of the present embodiment.

FIG. 9 is a flowchart describing a process of the embodiment. While the merge process for two image data that are the reading results of two image sensors 42 is described here, the merge process can be further applied to the case of three or more image data.

In a case where the process is started, first, the processing circuit 100 performs the position correction process on the first image data and the second image data (S101). The process of S101 is position correction in the subscan direction illustrated in FIG. 7 and position correction in the main scanning direction illustrated in FIG. 8.

Next, the processing circuit 100 calculates the evaluation value to be used for determination of the correction value based on data of the overlap area in the first image data and data of the overlap area in the second image data (S102). Furthermore, the processing circuit 100 determines the correction value based on the evaluation value and performs the offset process on the first image data (S103). In addition, the processing circuit 100 determines the correction value based on the evaluation value and performs the offset process on the second image data (S104). The processes of S103 and S104 may be reversed in order or may be executed in parallel.

After the execution of S103 and S104, a blending process for the overlap area between the first image data after the offset process and the second image data after the offset process is performed (S105). By performing the processes of S102 to S105, the merge process for the image data of given one line as a target is completed. The processing circuit 100 determines whether or not the merge process is performed on all lines of the image data (S106) and finishes the merge process after processing of all lines is finished (Yes in S106). In a case where a line that is not processed yet is present (No in S106), a return is made to S102, and the merge process for the subsequent line as a target is executed. Hereinafter, each process of S102 to S105 will be described in detail.

2.2 Calculation Process for Evaluation Value

Figure 10:
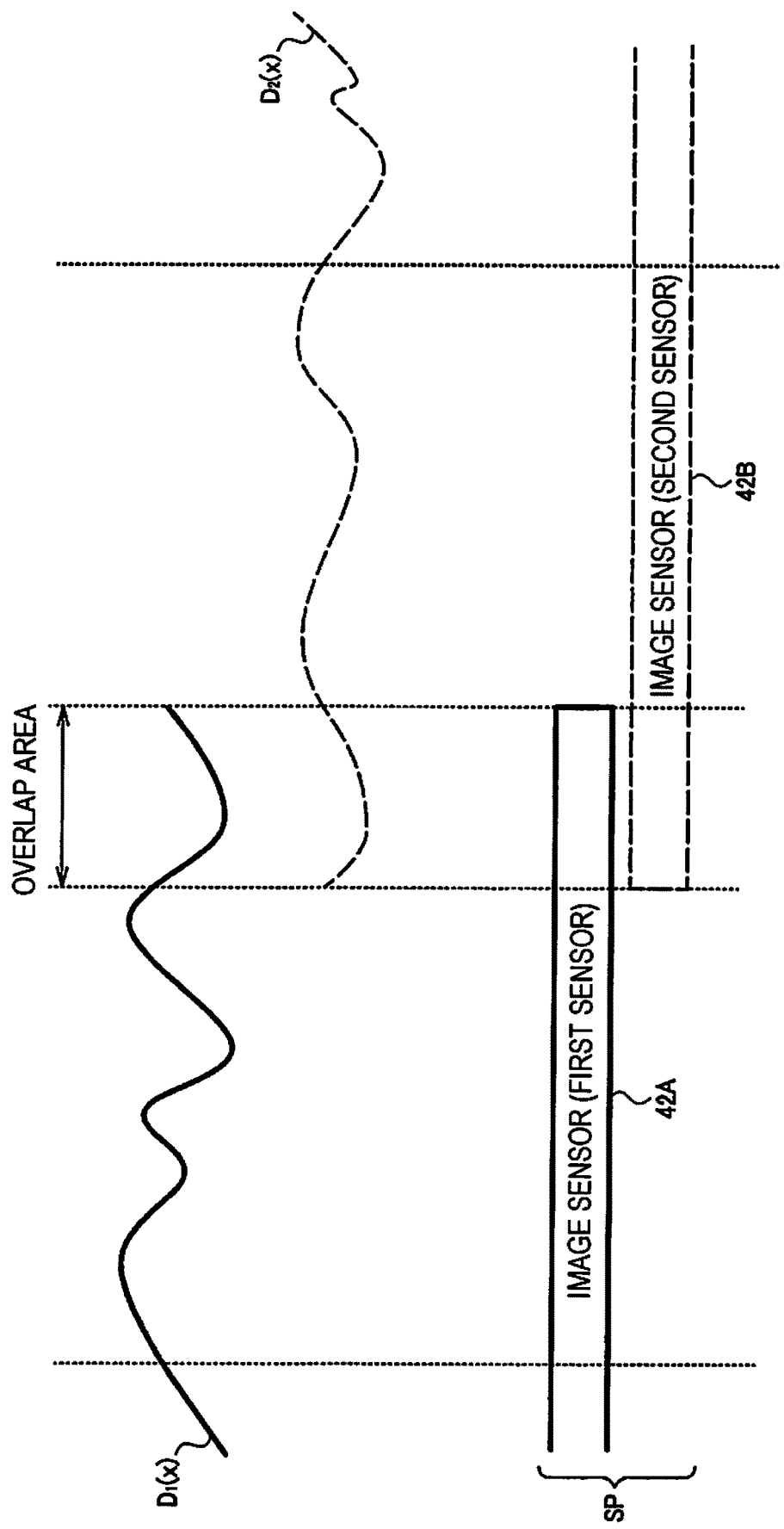
FIG. 10 is an example of a pixel value of the image data.

The calculation process for the evaluation value illustrated in S102 will be described. FIG. 10 is a diagram representing the pixel value of the first image data and the pixel value of the second image data in a given line. In FIG. 10, a horizontal direction represents the main scanning direction, and SP denotes the position of the image sensor 42A, which is the first sensor, in the main scanning direction and the position of the image sensor 42B, which is the second sensor, in the main scanning direction. The positional relationship among the image sensors 42 in the subscan direction is not particularly considered in SP. In addition, $D_1$ denotes a graph representing the pixel value of the first image data, and $D_2$ denotes a graph representing the pixel value of the second image data. The vertical axis of the graph corresponds to the pixel value.

Figure 11:
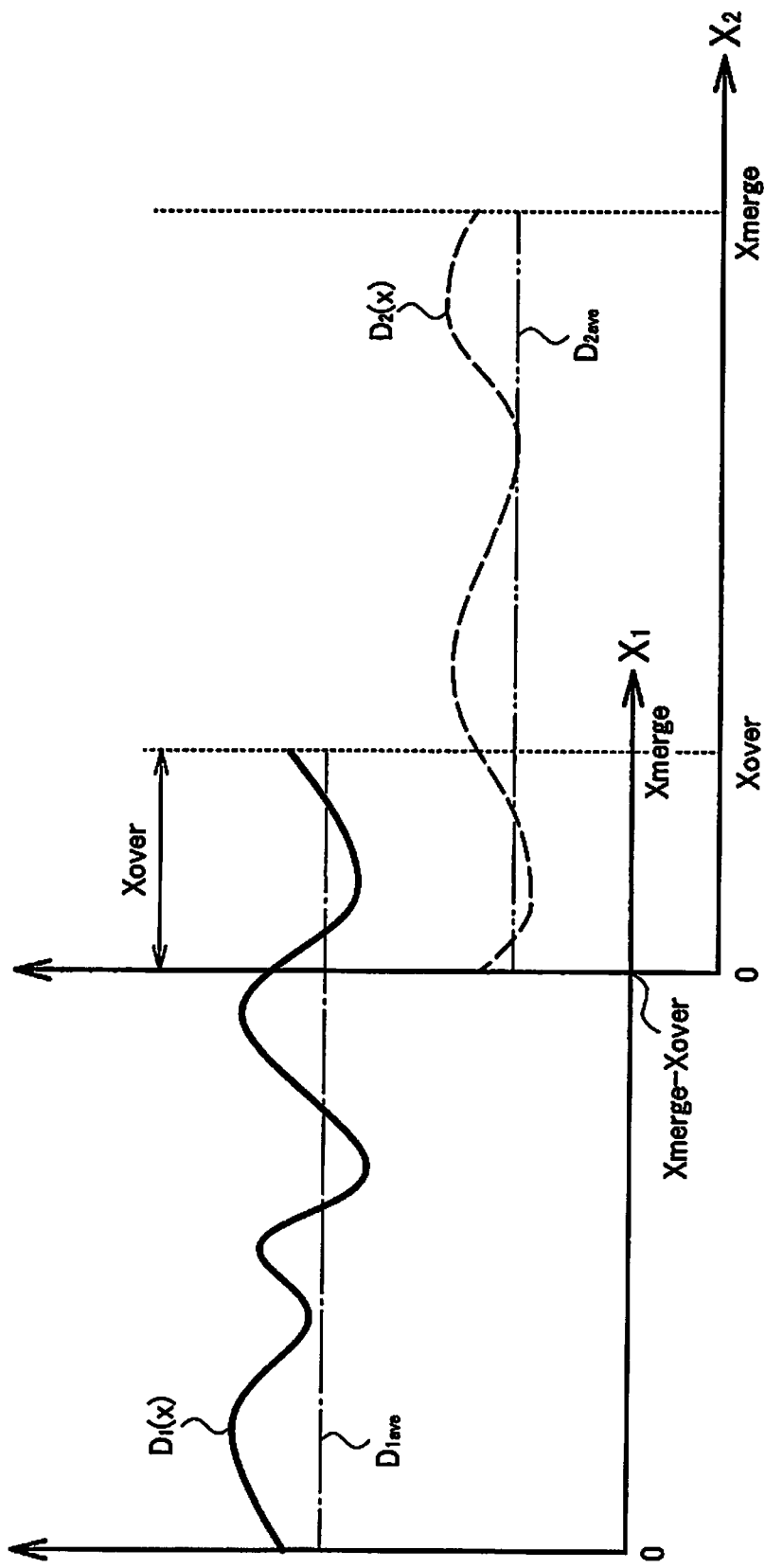
FIG. 11 is a diagram describing coordinate axis setting and an evaluation value calculation process.

FIG. 11 is a diagram describing a setting process for a coordinate system and an evaluation value calculation process in the embodiment. First, the coordinate system will be described. In the embodiment, the offset process is performed on a range of a given number of pixels in the first image data as a target. The number of pixels in the target area of the offset process is denoted by Xmerge. Hereinafter, the target area of the offset process will be referred to as a correction target area. Here, Xmerge is a value less than or equal to the number of pixels corresponding to the horizontal width of the image sensor 42A which is the first sensor. More specifically, Xmerge is a value less than or equal to half of the number of pixels corresponding to the horizontal width of the image sensor 42A.

In addition, in the second image data, a partial range is set as a target of the offset process, and the number of pixels in the correction target area is denoted by Xmerge. While an example in which the number of pixels in the correction target area is the same in the first image data and the second image data is described here, a different number of pixels in the correction target area may be set depending on the image data.

In addition, the number of pixels in the overlap area is denoted by Xover. In the embodiment, it is necessary to prevent the joint from standing out, and a range that includes the overlap area and is larger than the overlap area needs to be set as the correction target area. That is, Xmerge>Xover is established.

An $X_1$ axis is an axis that is set in the main scanning direction and is a coordinate axis on which the $x_1$ coordinate value of the end point of the overlap area on the second image data side is equal to Xmerge. The end point of the overlap area on the second image data is the end point of the first image data and is the end point of the first image data on one side of the correction target area. Thus, the origin of the $X_1$ axis is the end point of the first image data on the other side of the correction target area.

In addition, an $X_2$ axis is an axis that is set in the main scanning direction and is a coordinate axis of which the origin is the end point of the overlap area on the first image data side. The end point of the overlap area on the first image data side is the end point of the second image data and is the end point of the second image data on one side of the correction target area. Thus, in the case of setting the origin in such a manner, the $X_2$ coordinate value of the end point of the second image data on the other side of the correction target area is equal to Xmerge.

As illustrated in FIG. 10, while the first image data is present in a range in which the $X_1$ coordinate value satisfies $x_1<0$, the first image data in the range is not a target of the offset process in the embodiment. In addition, the image sensor 42A is almost not present in the range of $x_1>$Xmerge. Thus, in the offset process for the first image data, $x_1$ that is in the range of $0 \leq x_1 \leq$Xmerge is considered as the $X_1$ coordinate value. Hereinafter, the pixel value of the first image data at a location at which the $X_1$ coordinate value is equal to $x_1$ will be referred to as $D_1(x_1)$. Similarly, in the offset process for the second image data, $x_2$ in the range of $0 \leq x_2 \leq$Xmerge is considered as the $X_2$ coordinate value. The pixel value of the second image data at a location at which the $X_2$ coordinate value is equal to $x_2$ will be referred to as $D_2(x_2)$.

The processing circuit 100 of the embodiment calculates the correction value based on the average value of the pixel values acquired by reading the overlap area by the first sensor and the average value of the pixel values acquired by reading the overlap area by the second sensor. In the example in FIG. 11, the pixel value acquired by reading the overlap area by the first sensor is denoted by $D_1(x_1)$ in the case of $($Xmerge$-$Xover$) \leq x_1 \leq$Xmerge, and the pixel value acquired by reading the overlap area by the second sensor is denoted by $D_2(x_2)$ in the case of $0 \leq x_2 \leq$Xover.

In the overlap area, the same image is a reading target. Thus, $D_1$ and $D_2$ are ideally to match in a case where there are no individual differences among the image sensors 42 or no differences in the orientation of the original document D. In a case where the difference between the characteristics of the pixel value acquired by reading the overlap area by the first sensor and the characteristics of the pixel value acquired by reading the overlap area by the second sensor is known, the joint can be appropriately corrected by a process that reduces the difference. In this case, a process of obtaining the evaluation value and a process of obtaining the correction value based on the evaluation value can be easily performed by using a statistical quantity such as an average value as the evaluation value representing the characteristics. An average value $D_{1ave}$ of the pixel values acquired by reading the overlap area by the first sensor is obtained using Expression (1), and an average value $D_{2ave}$ of the pixel values acquired by reading the overlap area by the second sensor is obtained using Expression (2). While an arithmetic mean is used in Expressions (1) and (2), a modification can be made such that a weighted mean or a trimmed mean is used as the average value. In addition, as described above, $D_1$ and $D_2$ are ideally to match. By appropriately setting an upper limit value for the evaluation value and the correction value, excessive correction can be reduced even in a case where the value of the difference between $D_1$ and $D_2$ is increased due to a sudden cause.

$$D_{1ave} = \sum_{x_1 = Xmerge-Xover}^{Xmerge} \frac{D_1(x_1)}{Xover} \quad (1)$$

$$D_{2ave} = \sum_{x_2=0}^{Xover} \frac{D_2(x_2)}{Xover} \quad (2)$$

2.3 Offset Process for First Image Data

The offset process for the first image data illustrated in S103 will be described. As described above using FIG. 11, an example of setting the $X_1$ axis in a direction corresponding to the main scanning direction of the image reading apparatus 11 for the first image data, setting Xmerge as the $X_1$ coordinate value of the overlap area side end point of two end points of the area on which the offset process is performed in the first image data, and setting the $X_1$ coordinate value of the end point on the other side to zero is considered in the embodiment.

In the embodiment, in a case where a coefficient that is obtained based on the average value $D_{1ave}$ of the pixel values acquired by reading the overlap area by the first sensor, the average value $D_{2ave}$ of the pixel values acquired by reading the overlap area by the second sensor, and Xmerge that is the length of the area on which the offset process is performed in the first image data is denoted by A, the offset process for the first image data is performed using Expression (3). In Expression (3), the pixel value of the first image data in a case where the $X_1$ coordinate value is equal to $x_1$ satisfying $0 \le x_1 \le Xmerge$ is denoted by $D_1(x_1)$, and the pixel value of the first image data after the offset process is denoted by $D'_1(x_1)$.

$$D'_1(x_1) = D_1(x_1) + A \times x_1 \quad (3)$$

As illustrated in FIG. 11, in the case of the above setting, the overlap area is approached as $x_1$ is increased. That is, in the example of Expression (3), a correction value $A \times x_1$ is set as a linear value such that its absolute value is high on the overlap area side, and its value approaches zero as being away from the overlap area, that is, in a direction toward the negative direction side of the $X_2$ axis. In Expression (3), the correction value is equal to zero at $x_1=0$ that is the end point of the correction target area. Thus, the boundary between the correction target area and the area outside the target can be smoothly coupled. By using such a correction value, the correction process that reduces excessive correction outside the overlap area and prevents a difference in level at the joint from standing out can be implemented.

A specific offset process is performed using, for example, Expression (4).

$$D'_1(x_1) = D_1(x_1) + \frac{D_{2ave} - D_{1ave}}{2 \times Xmerge - Xover} x_1 \quad (4)$$

Figure 12:
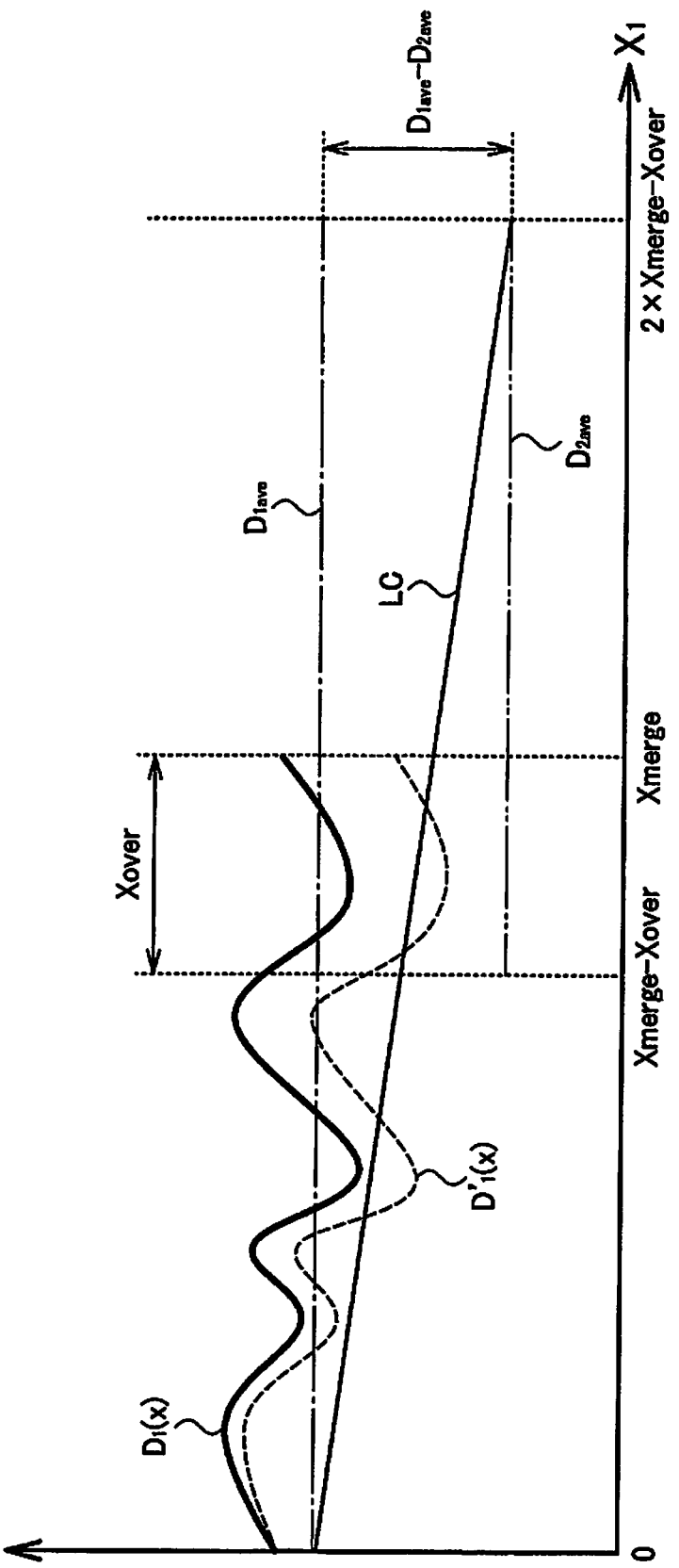
FIG. 12 is a diagram describing an offset process for first image data.

FIG. 12 is a diagram describing the offset process in Expression (4). As described above, the correction value is set such that the correction value is equal to zero at $x_1=0$, and its absolute value is increased as $x_2$ is increased. However, in terms of reducing a difference in level at the joint, it is sufficient that the total of the change width of $D_1$ and the change width of $D_2$ is equal to $|D_{1ave}-D_{2ave}|$, and correction exceeding $|D_{1ave}-D_{2ave}|$ may be excessive correction. Thus, the correction coefficient A in Expression (3) is set such that $|A \times Xmerge| \le |D_{1ave}-D_{2ave}|$ is satisfied.

In FIG. 12, $x_1=2 \times Xmerge-Xover$ corresponds to a point at which $x_2=Xmerge$ is satisfied on the $X_2$ axis, that is, the end point of the correction target area of the second image data. By doing so, the correction value can be set such that its value linearly changes depending on the position in the main scanning direction in an area into which the correction target area of the first image data and the correction target area of the second image data are combined.

In this case, the coefficient A is equal to a value acquired by subtracting $D_{1ave}$ from a value of a straight line illustrated by LC. Here, $D_{1ave} > D_{2ave}$ is satisfied. Thus, A<0 is satisfied. The change width of $D_1$ caused by the offset process is equal to zero at the time of $x_1=0$, is increased as $x_1$ is increased, and has a maximum value $|D_{1ave}-D_{2ave}|$ at $x_1=2 \times Xmerge-Xover$. However, since $x_1$ satisfies $0 \le x_1 \le Xmerge$, the change width of $D_1$ is restricted to a range below $|D_{1ave}-D_{2ave}|$, and an appropriate correction value can be set.

As will be described below using FIG. 13, by setting the correction value for the second image data using the same method, the sum of the amount of change of the first image data and the amount of change of the second image data in the overlap area can be set to $|D_{1ave}-D_{2ave}|$. In other words, in the overlap area, the correction value can be set such that a difference in evaluation value is removed.

2.4 Offset Process for Second Image Data

The offset process for the second image data illustrated in S104 will be described. The offset process for the second image data is the same as that for the first image data. In a case where a coefficient that is obtained based on $D_{1ave}$, $D_{2ave}$, and Xmerge is denoted by B, the processing circuit 100 performs the offset process for the second image data using Expression (5). In Expression (5), the pixel value of the second image data after the offset process is denoted by $D'_2(x_2)$.

$$D'_2(x_2) = D_2(x_2) + B \times (Xmerge - x_2) \quad (5)$$

In addition, the same point as the first image data is that an excessive increase in the absolute value of B is not preferable. Thus, a specific offset process is performed using, for example, Expression (6).

$$D'_2(x_2) = D_2(x_2) - \frac{D_{2ave} - D_{1ave}}{2 \times Xmerge - Xover}(Xmerge - x_2) \quad (6)$$

Figure 13:
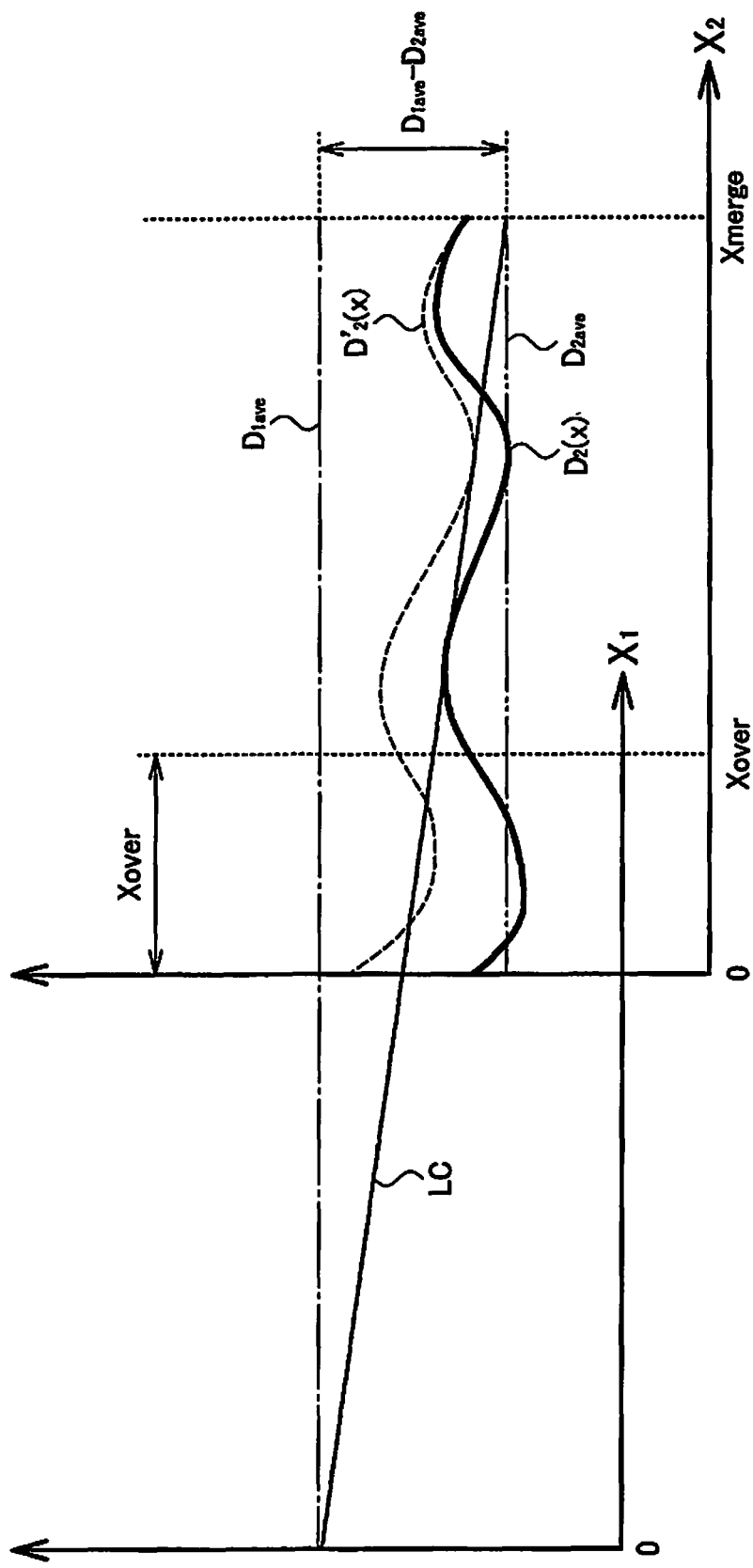
FIG. 13 is a diagram describing the offset process for second image data.

FIG. 13 is a diagram describing the offset process in Expression (6). A straight line illustrated by LC in FIG. 13 is the same as LC in FIG. 12. The origin of the $X_1$ axis, that is, the end point of the correction target area of the first image data, corresponds to $x_2=-(Xmerge-Xover)$. By using the correction coefficient corresponding to the inclination of LC in FIG. 13, the correction value can be set such that its value linearly changes depending on the position in the main scanning direction in the area into which the correction target area of the first image data and the correction target area of the second image data are combined.

In this case, the coefficient B is equal to a value acquired by reversing the sign of the coefficient in Expression (5) and is equal to a value acquired by subtracting $D_{2ave}$ from the value of the straight line illustrated by LC. Here, $D_{1ave} > D_{2ave}$ is satisfied. Thus, B>0 is satisfied. The change width of $D_2$ caused by the offset process is equal to zero at the time of $x_2=Xmerge$, is increased as $x_2$ is decreased, and has a maximum value $|D_{1ave}-D_{2ave}|$ at $x_2=-(Xmerge-Xover)$. However, since $x_2$ satisfies $0 \leq x_2 \leq Xmerge$, the change width of $D_2$ is restricted to a range below $|D_{1ave}-D_{2ave}|$. Accordingly, an appropriate correction value in which both of the change width of the pixel value caused by the offset process for the first image data and the change width of the pixel value caused by the offset process for the second image data are considered can be set.

2.5 Blending Process for Overlap Area

The blending process for the overlap area illustrated in S105 will be described. By the process described above, the first image data after the offset process and the second image data after the offset process are obtained.

Figure 14:
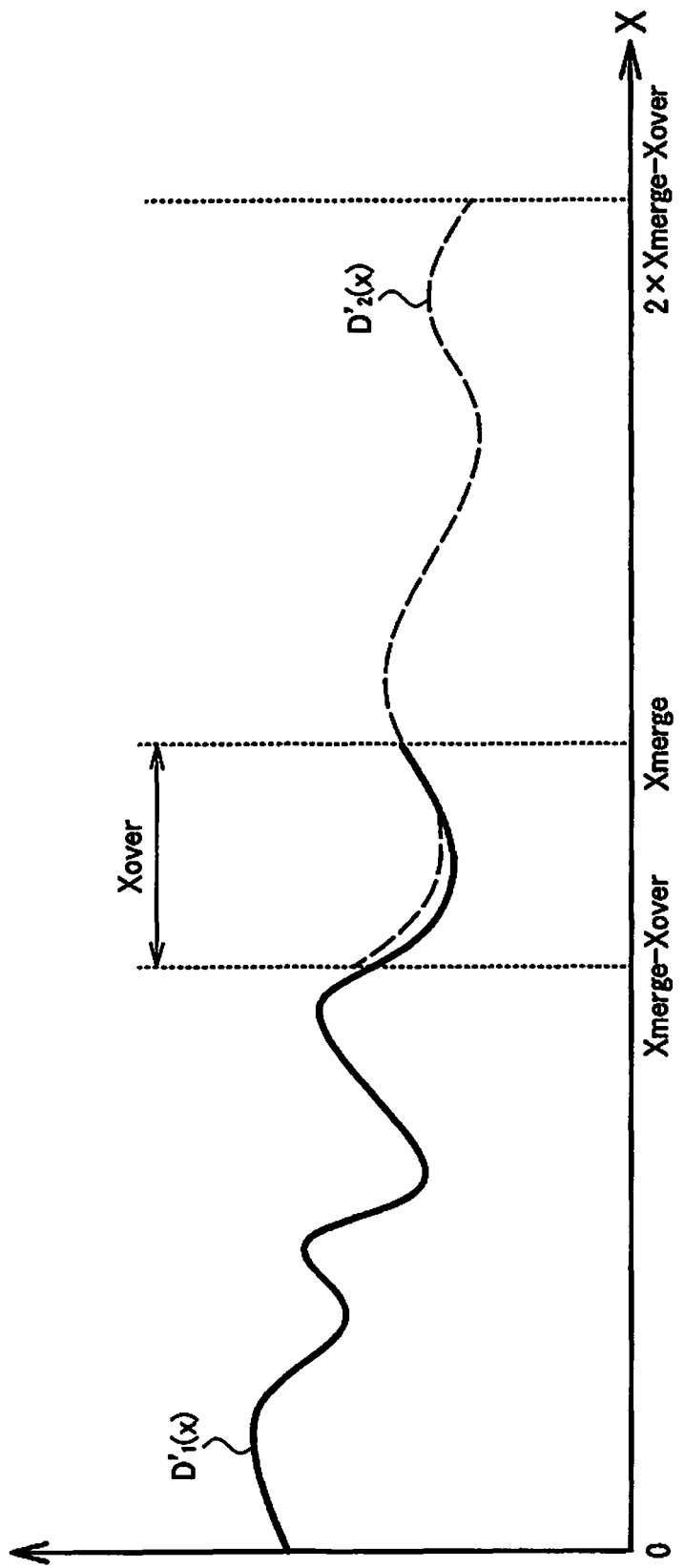
FIG. 14 is a diagram describing a blending process in an overlap area.

FIG. 14 is a diagram representing a pixel value $D'_1$ of the first image data after the offset process and a pixel value $D'_2$ of the second image data after the offset process. A horizontal axis in FIG. 14 is set as an X axis. The X axis is an axis in the main scanning direction and has its origin set at the same position as the $X_1$ axis. In a case where the X coordinate value is equal to x, the pixel value of the first image data after the offset process is denoted by $D'_1(x)$, and the pixel value of the second image data after the offset process is denoted by $D'_2(x)$.

As is apparent from FIG. 14, the difference in pixel value between $D'_1(x)$ and $D'_2(x)$ is considered to be smaller than that before the offset process. However, in many cases, the values do not completely match. Since two pixel values are present in the overlap area, a process of determining the pixel value of the final output image is needed.

The processing circuit 100 generates an image of an area corresponding to the overlap area in the merge image by performing the offset process on the first image data and the second image data using the correction value and merging the first image data after the offset process with the second image data after the offset process. By doing so, the pixel value of the merge image in the overlap area can be appropriately determined.

In the case of x<Xmerge−Xover, only the first image data is present, and the second image data is not present. Thus, in a case where the degree of contribution of $D'_2(x)$ is increased near x=Xmerge−Xover, a leap may occur in the pixel value at the boundary between the overlap area and an area other than the overlap area. Thus, the degree of contribution of $D'_1(x)$ may be increased in an area close to x=Xmerge−Xover. For example, in the case of blending $D'_1(x)$ and $D'_2(x)$ at a ratio of $\alpha:(1-\alpha)$, it is preferable that $\alpha=1$ be satisfied in the case of x=Xmerge−Xover. Similarly, it is preferable that $\alpha=0$ be satisfied in the case of x=Xmerge in order to increase the degree of contribution of $D'_2(x)$.

Thus, the processing circuit 100 determines a pixel value $D'(x)$ of the merge image using Expressions (7) to (9). In the case of x=Xmerge−Xover, Expression (7) matches Expression (8). In the case of x=Xmerge, Expression (7) matches Expression (9). In the case of Xmerge−Xover<x<Xmerge, the coefficient is determined such that as x is increased, the degree of contribution of $D'_1(x)$ is decreased, and the degree of contribution of $D'_2(x)$ is increased.

$$D'(x) = \frac{Xmerge - x}{Xover}D'_1(x) + \frac{x - Xmerge + Xover}{Xover}D'_2(x) \quad (7)$$
$$(Xmerge - Xover \leq x \leq Xmerge)$$

$$D'(x) = D'_1(x) \quad (0 \leq x \leq Xmerge - Xover) \quad (8)$$

$$D'(x) = D'_2(x) \quad (Xmerge \leq x) \quad (9)$$

While each expression is described above using the $X_1$ axis, the $X_2$ axis, and the X axis as a reference, those skilled in the art may perceive that various modifications can be made to the setting of the coordinate system. For example, the main scanning direction of the image reading apparatus 11 may be set as the X axis. Of two end points of the overlap area, the X coordinate value of the end point on the first sensor side may be denoted by $x_A$, and the X coordinate value of the end point on the second sensor may be denoted by $x_B$. In this case, the overlap area is a range in which the X coordinate value satisfies $x_A \leq x \leq x_B$. In the case of denoting the pixel value of the first image data after the offset process by $D'_1(x)$, denoting the pixel value of the second image data after the offset process by $D'_2(x)$, and denoting the pixel value of the merge image by $D'(x)$, Expression (7) can be modified into Expression (10).

$$D'(x) = \frac{x_B - x}{x_B - x_A}D'_1(x) + \frac{x - x_A}{x_B - x_A}D'_2(x) \quad (x_A \leq x \leq x_B) \quad (10)$$

Figure 15:
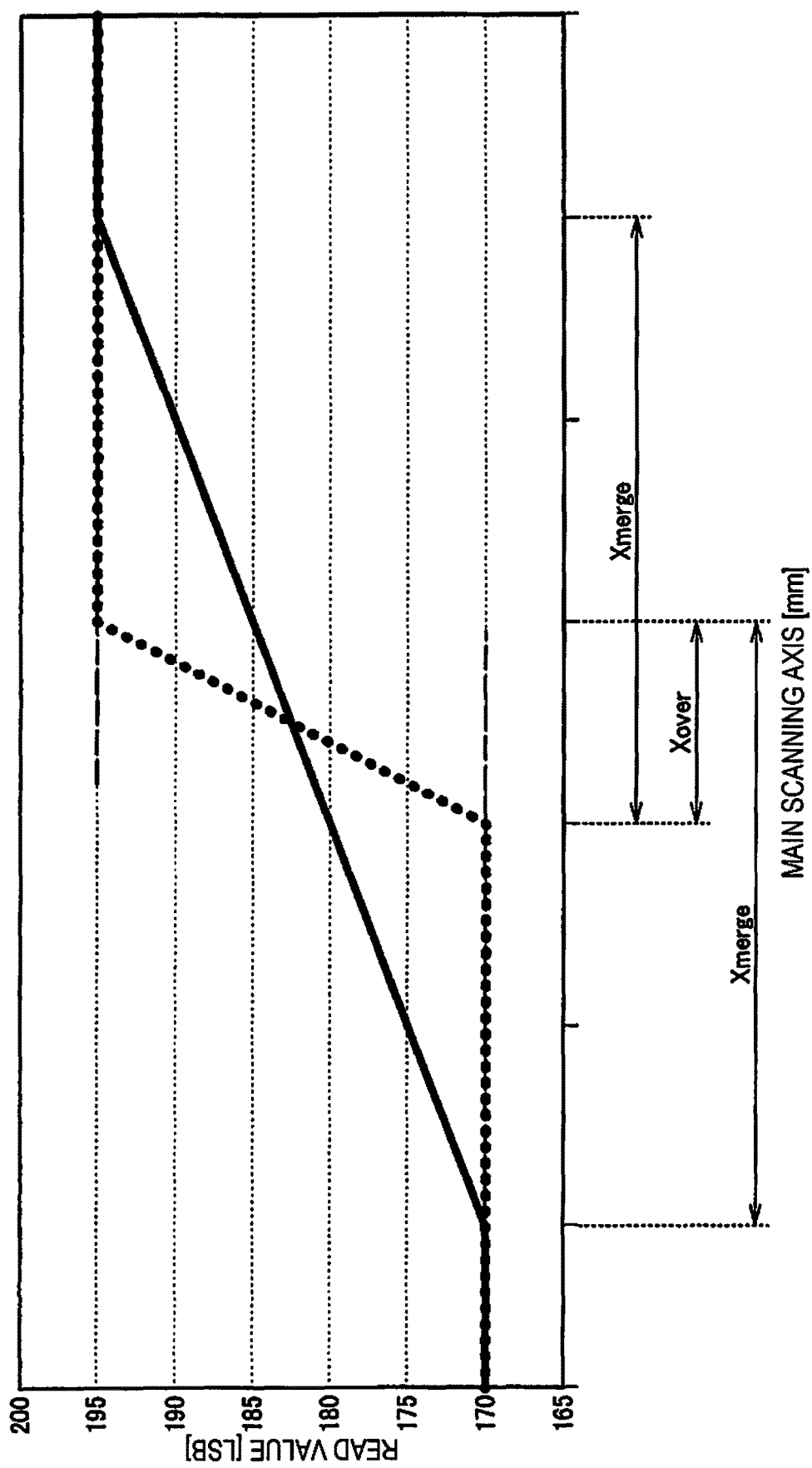
FIG. 15 is a diagram describing a difference in merge result caused by the presence of the offset process.

FIG. 15 is a diagram describing the merge process in a case where the pixel value of each image data is uniform. The result of the blending process in the case of not performing the offset process of the embodiment is denoted by B1. As is understood from B1, in the case of simply merging the overlap area, the pixel value changes sharply, and the joint stands out. The result of the blending process of the embodiment is denoted by B2. The first image data and the second image data are corrected by the offset process using the linearly changing correction value, and the blending process is performed after correction. Thus, a change in pixel value at the joint is made less sharp than that in B1. That is, in the embodiment, the correction process that prevents the joint from standing out can be implemented.

3. Modification Example

Hereinafter, several modification examples will be described.

3.1 Example Including Three or More Sensors

The merge process for two image data of the reading results of two image sensors 42 is described above. The image reading apparatus 11 of the embodiment may include three or more image sensors 42 as illustrated in FIG. 3 and FIG. 5. In this case, the reading area of the image sensor 42 other than those at both ends overlaps with that of a given image sensor 42 on one end side in the main scanning direction and overlaps with that of the other image sensor 42 on the other end side in the main scanning direction. In the example in FIG. 5, the reading area (RB) of the image sensor 42B overlaps with the reading area (RA) of the image sensor 42A on the left side of FIG. 5 and overlaps with the reading area (RC) of the image sensor 42C on the right side of FIG. 5.

The overlap among the first image data to the third image data is the same as illustrated in FIG. 8. The second image data (IB) is subjected to the merge process with the first image data (IA) on one end side and is subjected to the merge process with the third image data (IC) on the other end side. Since two image data can be merged using the method described above using FIG. 9 to FIG. 14, three image data can also be merged in a case where merging of the first image data with the second image data and merging of the second image data with the third image data are executed in order or in parallel. However, the relationship between the width of the correction target area as a target of the offset process and the width of the image sensor 42 is to be concerned. The relationship may be replaced with the relationship between the number of pixels Xmerge of the correction target area and the number of pixels of the image data in the main scanning direction.

Figure 16:
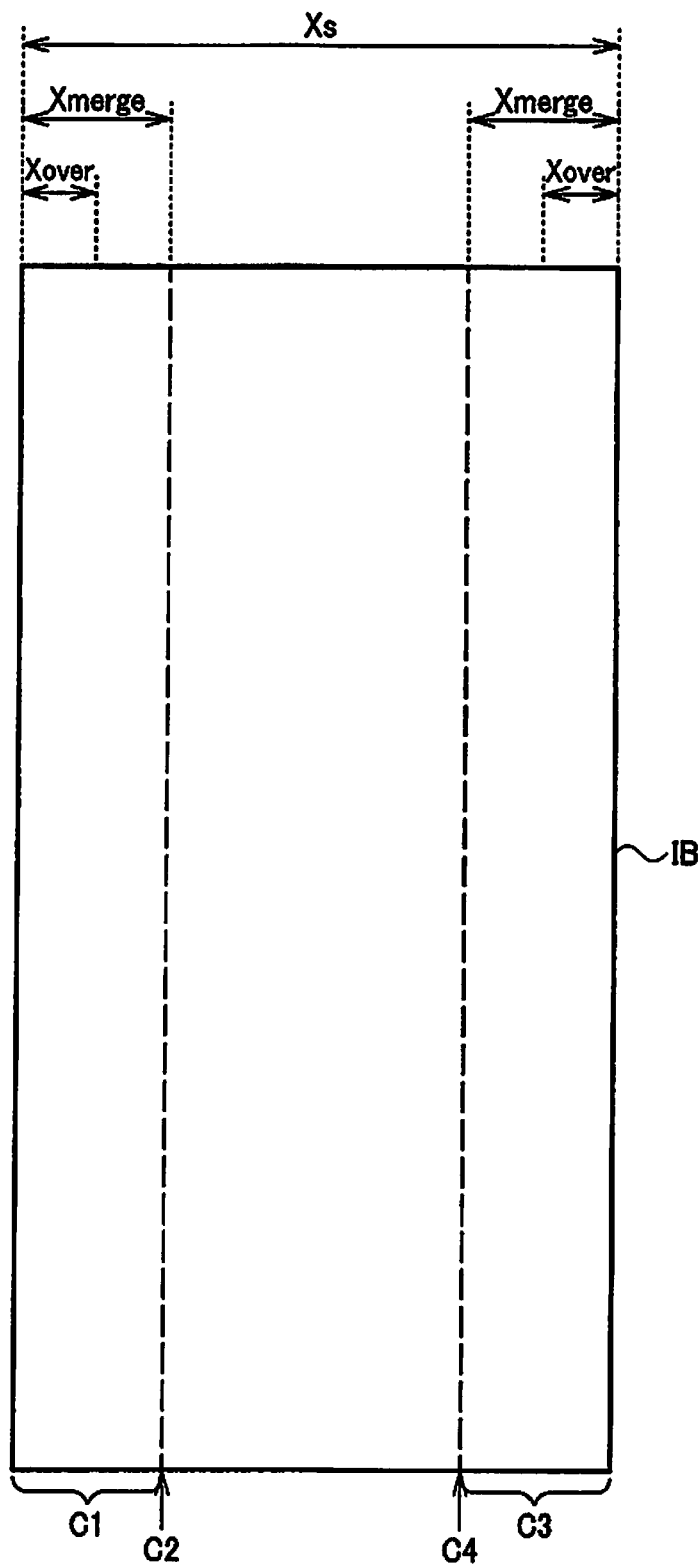
FIG. 16 is a diagram describing an example of setting a target area for the offset process.

FIG. 16 is a diagram describing the offset process for the second image data. As illustrated in FIG. 16, in the second image data, the offset process accompanied by the merge process with the first image data is performed on a range of one end to Xmerge, and the offset process accompanied by the merge process with the third image data is performed on a range of the other end to Xmerge. The number of pixels of the second image data in the main scanning direction is denoted by Xs.

As in FIG. 16, in the case of Xmerge≤Xs/2, the correction target area of the offset process on the first image data side does not overlap with the correction target area of the offset process on the third image data side. The equality is established in a case where Xs is an even number. In this case, two correction target areas are adjacent. In the case of Xmerge>Xs/2, two correction target areas overlap.

In a case where the correction target areas overlap, the processing circuit 100 needs to determine whether to employ the correction value of any one offset process or calculate a new correction value based on two correction values for the overlapping part. In other words, contention between two offset processes needs to be resolved, and processing is complicated.

The method of the embodiment prevents the joint of two image data from standing out as illustrated by B2 in FIG. 15. That is, it is sufficient that a condition that Xmerge has a width such that a change in pixel is made less sharp is satisfied. More precisely, an area (2×Xmerge−Xover) that is a target of the offset process in the merge process for the first image data and the second image data may be larger than the overlap area (Xover) and have a width such that a change in pixel is made less sharp. More specifically, it is preferable to set the amount of change in the amount of correction per unit length that does not perceptually stand out, and set Xmerge from an assumed degree of error between sensors such that the set amount of change in the amount of correction per unit length is satisfied.

Thus, the processing circuit 100 generates the merge image by performing a first offset process in which the offset process using the correction value is performed on an area of the first image data shorter than half of the length of the first sensor in the main scanning direction, and a second offset process in which the offset process using the correction value is performed on an area of the second image data shorter than half of the length of the second sensor in the main scanning direction.

By doing so, in a case where using three or more image sensors 42 requires the offset process at both ends of the image such as the second image data, the target areas of the offset processes that do not interfere with each other can be set. Accordingly, two offset processes can be easily implemented, and excessive correction in an area other than the overlap area can be reduced.

3.2 Example of Performing Offset Process on Only First Image

In addition, an example of performing both of the offset process on the first image data and the offset process on the second image data in the merge process for the first image data and the second image data is described above. Any one of the offset processes may be performed.

Simply, in the process described above using FIG. 10 to FIG. 14, the processing circuit 100 skips a process in FIG. 13 that corresponds to S104 in FIG. 9. In this case, in S105, the blending process for the first image data after the offset process and the second image data on which the offset process is not performed is executed. Specifically, $D'_2(x)$ in Expressions (7) and (9) is changed to $D_2(x)$. Even in a case where the process in FIG. 13 is omitted, the offset process is performed on the range of Xmerge as a target that is wider than the original overlap area Xover. Thus, the effect of preventing the joint from standing out may be sufficiently achieved.

However, as described above using FIG. 12 and FIG. 13, the correction value is a value acquired by assuming that the offset process is performed on both of the first image data and the second image data. As described above, in the example of $D_{1ave} > D_{2ave}$, the correction value is set such that the total of the decrease width of the pixel value of the first image data and the increase width of the pixel value of the second image data corresponds to $D_{1ave} - D_{2ave}$. Thus, in a case where the pixel value of the second image data is not increased by omitting the process in FIG. 13, the decrease width of the pixel value of the first image data is set to be smaller than $D_{1ave} - D_{2ave}$.

Thus, in the case of considering the magnitude of the absolute value of the correction value, the offset process for the first image data may be performed using a different correction value from that in FIG. 12. For example, the offset process is performed using Expression (11).

$$D'_1(x_1) = D_1(x_1) + \frac{D_{2ave} - D_{1ave}}{Xmerge} x_1 \quad (11)$$

Figure 17:
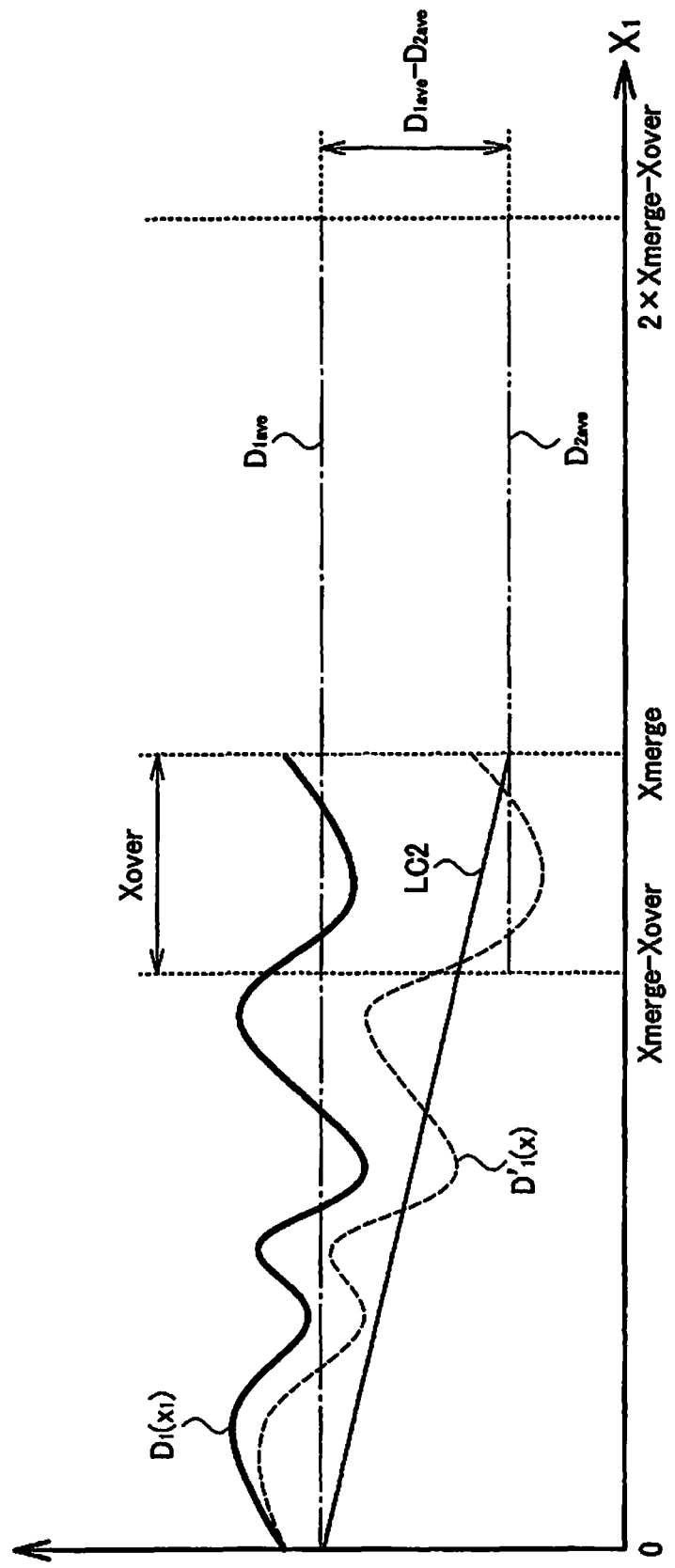
FIG. 17 is another diagram describing the offset process for the first image data.

FIG. 17 is a diagram describing the offset process in Expression (11). In the present modification example, the target of the offset process is not 2×Xmerge−Xover and is limited to Xmerge. Thus, in the range of 0≤$x_1$≤Xmerge, a straight line LC2 of which the value changes by $|D_{1ave} - D_{2ave}|$ is set, and a value acquired by subtracting $D_{1ave}$ from LC2 is set as the correction value. The change width of $D_1$ caused by the offset process is equal to zero at the time of $x_1=0$, is increased as $x_1$ is increased, and has a maximum value $|D_{1ave}-D_{2ave}|$ at $x_1$=Xmerge.

3.3 Moving Average in Subscan Direction

In addition, an example of setting the average value of the pixel values $D_1(x_1)$ and $D_2(x_2)$ in a line as the evaluation value in the case of performing the merge process on given one line of the image data is illustrated above. In a case where noise is mixed with the reading result of the line, an inappropriate evaluation value is set, and the tone and the brightness may become unnatural. For example, the merge image in which a difference in level occurs in the line is generated.

It is considered that an image of a given line and an image of a nearby line of the line in the image of the reading target have a certain degree of correlation. Thus, a high degree of correlation is expected between the evaluation value obtained from the pixel value of the given line and the evaluation value obtained from the pixel value of the nearby line. Thus, in the present modification example, the processing circuit 100 calculates the evaluation value based on information related to a plurality of lines including a processing target line.

For example, in the merge process for an n-th (n satisfies $0 \le n \le N$; N is a value representing the number of pixels of image data in the subscan direction) line of image data, the evaluation value is calculated based on the pixel values in a range of an (n−i)-th line to an (n+j)-th line. Here, i and j are non-negative integers. Any one of i and j may be equal to zero.

The pixel value of the first image data having an $X_1$ coordinate value equal to $x_1$ in a line corresponding to a y-th line in the subscan direction is denoted by $D_1(x_1, y)$. In this case, the average value is obtained in the range of $n-i \le y \le n+j$ in the subscan direction, and the average value is obtained in the range of (Xmerge−Xover)$\le x_1 \le$Xmerge in the main scanning direction, and the result of calculation is set as $D_{1ave}$. The calculation for obtaining the average value may be performed first in the main scanning direction or may be performed first in the subscan direction. In addition, the same applies to $D_{2ave}$. In other words, the average value in the main scanning direction that is the evaluation value for determining the correction value is calculated based on a moving average in the subscan direction.

In such a manner, by obtaining the evaluation value to be used in processing of a given line from information related to a plurality of lines, the effect of noise can be reduced.

3.4 Program and Like

In addition, a part or most of the processes of the image reading apparatus 11 and the processing circuit 100 of the embodiment may be implemented by a program. In this case, the image reading apparatus 11 and the like of the embodiment are implemented by causing a processor such as a CPU to execute the program. Specifically, the program that is stored in a non-transitory information storage medium is read, and the processor such as a CPU executes the read program. The information storage medium that is a computer-readable medium stores the program, data, and the like. The function of the information storage medium can be implemented by an optical disc such as a DVD or a CD, an HDD, a memory, or the like. The processor such as a CPU performs various processes of the embodiment based on the program stored in the information storage medium. That is, the information storage medium stores the program for causing a computer to function as each unit of the embodiment.

In addition, the method of the embodiment can be applied to a control method for the image reading apparatus 11, an operation method for the image reading apparatus 11, or an image generation method that executes a part or all of the steps illustrated in FIG. 9. The control method for the image reading apparatus 11 according to the embodiment is a control method for the image reading apparatus 11 that generates the merge image by performing the merge process on the first image data generated by reading by the first sensor and the second image data generated by reading by the second sensor. The control method includes calculating the correction value having a magnitude approaching zero as being away from the overlap area based on the reading result of the first sensor acquired by reading the overlap area between the first area and the second area and the reading result of the second sensor acquired by reading the overlap area, and generating the merge image by performing the offset process on at least one of the first image data and the second image data using the correction value.

While the embodiment to which the invention is applied and the modification examples are described above, the invention is not limited to the embodiment and the modification examples and can be implemented in the stage of embodiment by modifying constituents without departing from the nature of the invention. In addition, various invention can be formed by appropriately combining a plurality of constituents disclosed in the embodiment and the modification examples. For example, several constituents may be removed from all constituents disclosed in the embodiment and the modification examples. Furthermore, constituents described in different embodiments and modification examples may be appropriately combined. In addition, a term that is disclosed at least once along with a different term having a wider sense or the same sense in the specification or the drawings can be replaced with the different term at any location in the specification or the drawings. In such a manner, various modifications and applications can be made without departing from the gist of the invention. The invention is also not limited to the above expressions and may employ mathematically equivalent expressions and other expressions. However, the expression of the correction value is desirably an expression that approaches zero as being away from the overlap area in a case where the relationship between the position and the magnitude of the correction value is approximated to a linear expression. Further desirably, the expression of the correction value is an expression that monotonically changes.

What is claimed is:

1. An image reading apparatus comprising:
   a first sensor that reads a first area of an image of a reading target;
   a second sensor that reads a second area partially overlapping with the first area in the image, the first area and the second area having an overlap area, in which the first area and the second area overlap with each other, and a non-overlap area, in which the first area and the second area do not overlap with each other and which includes a first region where an offset process is not performed and a second region where the offset process is performed; and
   a processing circuit that generates a merge image by performing a merge process on first image data generated by reading by the first sensor and second image data generated by reading by the second sensor, wherein
   the processing circuit calculates a correction value which approaches zero as moving away from the overlap area in the second region of the non-overlap area based on a reading result acquired by reading the overlap area by the first sensor and a reading result acquired by reading the overlap area by the second sensor, without calculating the correction value in the first region of the non-overlap area, and generates the merge image by performing the offset process in the second region of the non-overlap area on at least one of the first image data and the second image data using the correction value, without generating the merge image by performing the offset process in the first region of the non-overlap area.

2. The image reading apparatus according to claim 1, wherein
the processing circuit generates the merge image by performing
a first offset process in which the offset process using the correction value is performed on an area of the first image data corresponding to half or less of a length of the first sensor in a main scanning axis, and
a second offset process in which the offset process using the correction value is performed on an area of the second image data corresponding to half or less of a length of the second sensor in the main scanning axis.

3. The image reading apparatus according to claim 1, wherein
the processing circuit calculates the correction value based on a pixel value acquired by reading the overlap area by the first sensor and a pixel value acquired by reading the overlap area by the second sensor.

4. The image reading apparatus according to claim 1, wherein
the processing circuit generates the merge image without performing gain correction on the first image data and the second image data.

5. The image reading apparatus according to claim 1, wherein
an $X_1$ axis is set for the first image data in a direction corresponding to a main scanning axis of the image reading apparatus,
for two end points of an area of the first image data on which the offset process is performed, an $X_1$ coordinate value of an end point on an overlap area side is set to Xmerge, and an $X_1$ coordinate value of an end point on another side is set to zero, and $$D'_1(x_1) = D_1(x_1) + A \times x_1, \text{ wherein}$$

A is a coefficient obtained based on an average value of pixel values acquired by reading the overlap area by the first sensor, an average value of pixel values acquired by reading the overlap area by the second sensor, and Xmerge that is a length of an area of the first image data on which the offset process is performed, and
at $x_1$ at which the $X_1$ coordinate value satisfies $0 \leq x_1 \leq$ Xmerge, $D_1(x_1)$ is a pixel value of the first image data and $D'_1(x_1)$ is a pixel value of the first image data after the offset process.

6. The image reading apparatus according to claim 1, wherein
the processing circuit
performs the offset process on the first image data and the second image data using the correction value, and generates an image of an area of the merge image corresponding to the overlap area by merging the first image data after the offset process with the second image data after the offset process.

7. The image reading apparatus according to claim 6, wherein $$D'(x) = \frac{x_B - x}{x_B - x_A} D'_1(x) + \frac{x - x_A}{x_B - x_A} D'_2(x).$$

x being equal to or smaller than $x_A$ and equal to or larger than $x_B$, wherein
an X axis is set in a direction corresponding to a main scanning axis of the image reading apparatus, and for two end points of the overlap area, $x_A$ is an X coordinate value of an end point on the first sensor, and $x_B$ is an X coordinate value of an end point on the second sensor, $x_A$ being smaller than $x_B$, and
at x at which the X coordinate value satisfies $x_A \leq x \leq x_B$, $D'_1(x)$ is a pixel value of the first image data after the offset process, $D'_2(x)$ is a pixel value of the second image data after the offset process, and $D'(x)$ is a pixel value of the merge image.

8. The image reading apparatus according to claim 1, further comprising:
a first analog front end that performs A/D conversion on an analog signal from the first sensor and outputs the first image data which is digital data to the processing circuit; and
a second analog front end that performs A/D conversion on an analog signal from the second sensor and outputs the second image data which is digital data to the processing circuit, wherein
the processing circuit performs the offset process by digital signal processing based on the first image data from the first analog front end and the second image data from the second analog front end.

9. The image reading apparatus according to claim 1, wherein
the first region of the non-overlap area is longer than the overlap area in a direction corresponding to a main scanning axis of the image reading apparatus.

10. A non-transitory storage medium storing a program that generates a merge image by performing a merge process on first image data generated by reading by a first sensor reading a first area of an image of a reading target and second image data generated by reading by a second sensor reading a second area partially overlapping with the first area in the image, the first area and the second area having an overlap area, in which the first area and the second area overlap with each other, and a non-overlap area, in which the first area and the second area do not overlap with each other and which includes a first region where an offset process is not performed and a second region where the offset process is performed, the program causing a computer to execute:
calculating a correction value which approaches zero as moving away from the overlap area in the second region of the non-overlap area based on a reading result acquired by reading the overlap area by the first sensor and a reading result acquired by reading the overlap area by the second sensor, without calculating the correction value in the first region of the non-overlap area; and
generating the merge image by performing the offset process in the second region of the non-overlap area on at least one of the first image data and the second image data using the correction value, without generating the merge image by performing the offset process in the first region of the non-overlap area.

11. An image generation method for generating a merge image by performing a merge process on first image data generated by reading by a first sensor reading a first area of an image of a reading target and second image data generated by reading by a second sensor reading a second area partially overlapping with the first area in the image, the first area and the second area having an overlap area, in which the first area and the second area overlap with each other, and a non-overlap area, in which the first area and the second area do not overlap with each other and which includes a first region where an offset process is not performed and a second region where the offset process is performed, the method comprising:

calculating a correction value which approaches zero as moving away from the overlap area in the second region of the non-overlap area based on a reading result acquired by reading the overlap area by the first sensor and a reading result acquired by reading the overlap area by the second sensor, without calculating the correction value in the first region of the non-overlap area; and generating the merge image by performing the offset process in the second region of the non-overlap area on at least one of the first image data and the second image data using the correction value, without generating the merge image by performing the offset process in the first region of the non-overlap area.

* * * * *